(12) United States Patent
Shiigi et al.

(10) Patent No.: US 7,938,041 B1
(45) Date of Patent: May 10, 2011

(54) BI-DIRECTIONAL OVERRUNNING CLUTCHED DIFFERENTIAL UNIT

(75) Inventors: Hiroki Shiigi, Amagasaki (JP); Tomoyuki Ebihara, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 465 days.

(21) Appl. No.: 12/193,194

(22) Filed: Aug. 18, 2008

(51) Int. Cl.
*F16H 48/12* (2006.01)
*F16D 23/00* (2006.01)
*F16D 41/00* (2006.01)

(52) U.S. Cl. ............... 74/650; 192/35; 192/38; 192/50
(58) Field of Classification Search ............ 74/665 F
See application file for complete search history.

(56) References Cited

U.S. PATENT DOCUMENTS

| 5,025,902 | A | * | 6/1991 | Imai et al. ............... 192/43 |
| 5,355,748 | A | * | 10/1994 | Ito et al. ............... 74/650 |
| RE38,012 | E | | 3/2003 | Ochab et al. |
| 2006/0005661 | A1 | * | 1/2006 | Kagata ............... 74/650 |
| 2006/0213742 | A1 | * | 9/2006 | Irikura et al. ............... 192/44 |
| 2006/0254382 | A1 | | 11/2006 | Ebihara |

OTHER PUBLICATIONS

Kochidomari et al., U.S. Appl. No. 12/422,549, filed Apr. 13, 2009.

* cited by examiner

*Primary Examiner* — Edwin A. Young
(74) *Attorney, Agent, or Firm* — Sterne, Kessler, Goldstein & Fox P.L.L.C.

(57) ABSTRACT

In a bi-directional overrunning clutched differential unit, a pair of coaxial hubs are relatively unrotatably fitted on respective coaxial output shafts, and are relatively rotatably inserted into a cage holding rollers. A pair of second bearings journal a clutch housing disposed around the cage is diametrically larger than a pair of first bearings journaling the respective hubs, and are disposed between the first bearings in the axial direction of the output shafts. An axial end portion of the cage and the second bearing on the same axial side are distant from the first bearing on the same axial side so as to have a space where a friction mechanism for applying a frictional rotation resistance onto the cage is disposed.

3 Claims, 18 Drawing Sheets

BI-DIRECTIONAL OVERRUNNING CLUTCHED DIFFERENTIAL UNIT

BACKGROUND OF THE INVENTION

1. Field of the Invention

The present invention relates to a bi-directional overrunning clutched differential unit whose output shafts are freely, differentially rotatable from an input power unless the rotation speed of the output shafts becomes less than that of an input rotation as a result of the input power.

2. Related Art

As disclosed in US RE 38,012 E (hereinafter, "the '012 patent") and US 2006/0254382 A1 (hereinafter, "the '382 Publication"), there are well-known conventional bi-directional overrunning clutched differential units. In each of these differential units, a differential housing supports a pair of coaxial output shafts (referred to as right and left output shafts), and the output shafts are freely, differentially rotatable from an input power unless the rotation speed of the output shafts becomes less than that of an input rotation as a result of the input power.

Each of the differential units includes a cylindrical cage disposed around the right and left output shafts. The cage holds right rollers aligned at regular intervals along the periphery thereof, and holds left rollers disposed leftward of the respective right rollers. In the differential unit of the '012 patent, a pair of right and left hubs are relatively unrotatably fitted on axially proximal end portions of the respective right and left output shafts. The axially proximal end portions of the right and left output shafts with the respective hubs thereon are relatively rotatably fitted into the cage, and in the cage, the axially proximal end portion of one output shaft is relatively rotatably fitted into the axially proximal end portion of the other output shaft. As a result, the right output shaft with the right hub thereon is relatively rotatably connected coaxially to the left output shaft with the left hub thereon. In the differential gear unit of the '382 Publication, the axially proximal end portions of the right and left output shafts with no hub thereon are fitted into the cage relatively rotatably to the cage and to each other.

In each of the differential units, a cylindrical clutch housing serving as an input rotary member is rotatably integrally provided thereon with a ring gear serving as an input gear, and is coaxially disposed around the cage. The clutch housing is formed on the inner peripheral surface thereof with cams corresponding to the respective rollers. Further, each differential unit includes a friction mechanism for applying a frictional rotation resistance onto the cage. As a result of the frictional rotation resistance, the rotation of the cage is delayed relative to the rotation of the clutch housing so that the rollers contact the respective cams. In this situation, when the rotation speed of the output shafts becomes less than the rotation speed of the clutch housing and ring gear, the rollers are wedged up between the respective cams and the hubs or output shafts, thereby engaging the overrunning clutch of the differential unit so as to transmit the input rotary force of the ring gear to the output shafts.

With regard to mechanisms for journaling the clutch housing, in the differential unit of the '012 patent, the clutch housing is journalled at only an axial intermediate outer peripheral portion thereof by the differential housing through a single bush. In the differential unit of the '382 Publication, the clutch housing (in this reference, "ring gear cage") is journalled at one axial end thereof by the differential housing through a ball bearing, and at the other axial end thereof by the differential housing through a bush.

In the differential unit of the '012 patent, the single bush is axially wide, however, it is insufficient to prevent the rotating clutch housing from deviating. On the other hand, in the differential unit of the '382 Publication, the two bearings, i.e., the ball bearing and bush, journaling the axially opposite ends of the clutch housing are relatively advantageous in preventing deviation of the rotating clutch housing in comparison with the single bush journaling only the axially intermediate portion of the clutch housing as in the '012 patent. However, the differential unit of the '382 Publication is still insufficient in durability because it uses the bush.

With regard to mechanisms for journaling the output shafts, in the differential unit of the '382 Publication, the output shafts with no hub thereon project outward from the cage so as to be journalled by the differential housing through respective ball bearings. In the cage, the output shafts are independently separated from each other. Therefore, the decentering or torsion force of each of the output shafts that is insufficiently eliminated by each of the ball bearings is subjected to be transmitted to the rollers and the clutch housing. Consequently, the differential unit of the '382 Publication is insufficient in durability.

On the other hand, in the differential unit of the '012 patent, in the cage, the axially proximal ends of the output shafts are adjacent to each other, and a projection projecting from the axially proximal end of one output shaft is relatively rotatably fitted into the axially proximal end portion of the other output shaft so as to prevent the output shafts from decentering from each other during their rotation. On the outsides of the cage, the right and left hubs are journalled by the differential housing through respective ball bearings. However, when the axially proximal ends of the output shafts are adjacent to each other, lubricant oil filled in the differential housing is insufficiently supplied to splines which are formed on an peripheral surface of the axially proximal end portions of the respective output shafts, thereby causing the output shafts and hubs to be worn at their mutual meshing portions (splines) or to be rusted.

SUMMARY OF THE INVENTION

An object of the invention is to provide a durable bi-directional overrunning clutched differential unit wherein a cylindrical clutch housing, a cylindrical cage and right and left output shafts are stably journalled without decentering or torsion.

To achieve the object, according to the invention, a bi-directional overrunning clutched differential unit comprises a differential housing, a pair of coaxial output shafts, a pair of coaxial cylindrical hubs, a pair of first bearings, a cylindrical cage, a cylindrical clutch housing, a pair of second bearings, first and second groups of rollers, cams, and a friction mechanism. The pair of coaxial output shafts are relatively rotatably supported by the differential housing. The pair of coaxial cylindrical hubs are relatively unrotatably fitted on the respective output shafts. An axially proximal end of one of the hubs is relatively unrotatably fitted into an axially proximal end of the other of the hubs. The pair of first bearings are disposed opposite to each other in the axial direction of the output shafts, and are supported by the differential housing so as to journal the respective hubs. The cylindrical cage is coaxially disposed around the hubs between the first bearings. The cylindrical clutch housing is coaxially disposed around the cage between the first bearings. The pair of second bearings are disposed opposite to each other in the axial direction of the output shafts, and are supported by the differential housing so as to journal the clutch housing. The pair of second bearings are diametrically larger than the first bearings, and are disposed between the first bearings in the axial direction of the output shafts so as to ensure a space between one of the first bearings and one of the second bearings. The first and second groups of rollers are held by the cage. The rollers of the first group are aligned at regular intervals along the periphery of the cage and contact an outer peripheral surface of one of the hubs. The rollers of the second group are aligned at regular intervals along the periphery of the cage and contact an outer peripheral surface of the other of the hubs. The cams are formed on an inner peripheral surface of the clutch housing so as to be adapted to radially press each of the rollers against the respective hubs. The friction mechanism is disposed in the space so as to apply a frictional rotation resistance onto the cage.

As a result of the second bearings, the cylindrical clutch housing is stably journalled at axial opposite portions thereof without decentering or torsion. Further, as a result of the hubs and the first bearings, the pair of output shafts are constantly and stably oriented coaxially to each other. To relatively rotatably and coaxially arrange the pair of output shafts in the cage, as the hubs can be extended axially proximally toward each other so as to be relatively rotatably fitted to each other, the axially proximal ends of the output shafts (that may be splined) can be distant from each other so as to have a sufficiently large space therebetween in the cage. Therefore, the hubs and the output shafts in the hubs are sufficiently supplied with lubricant oil filled in the differential housing so as to be prevented from being worn at mutual meshing portions (splines) thereof and from being rusted. Therefore, the differential unit is improved in durability. Further, since the friction mechanism is disposed in the space between the first and second bearings, the differential unit can be prevented from being expanded outward.

Preferably, in the differential unit, the friction mechanism disposed in the space includes a rotary friction member, a fixture friction member, and a pressure means. The rotary friction member is rotatably integrally engaged to a corresponding axial end of the cage. The fixture friction member is unrotatably engaged to the differential housing. The pressure means frictionally presses the rotary friction member and the fixture friction member against each other. As a result of such a simple construction of the friction mechanism including fewer components, the differential unit can be minimized, economized and facilitated in assembly.

Further preferably, the fixture friction member is integrally formed with an elastic portion serving as the spring means. Therefore, the number of components of the friction mechanism is further reduced so as to further simplify the assembly of the differential unit.

Further preferably, the differential unit further comprises an actuator supported by the differential housing. The actuator is adapted to disengage the fixture friction member from the differential housing so as to allow the fixture friction member to rotate together with the rotary friction member. As a result of the actuator, when the actuator disengages the fixture friction member from the differential housing, the cage can be rotatable free from the friction mechanism so as to constantly allow the output shafts to rotate freely from the rotation force of the clutch housing.

These, other and further objects, features and advantages of the invention will appear more fully from the following description with reference to accompanying drawings.

DETAILED DESCRIPTION OF THE INVENTION

Figure 1:
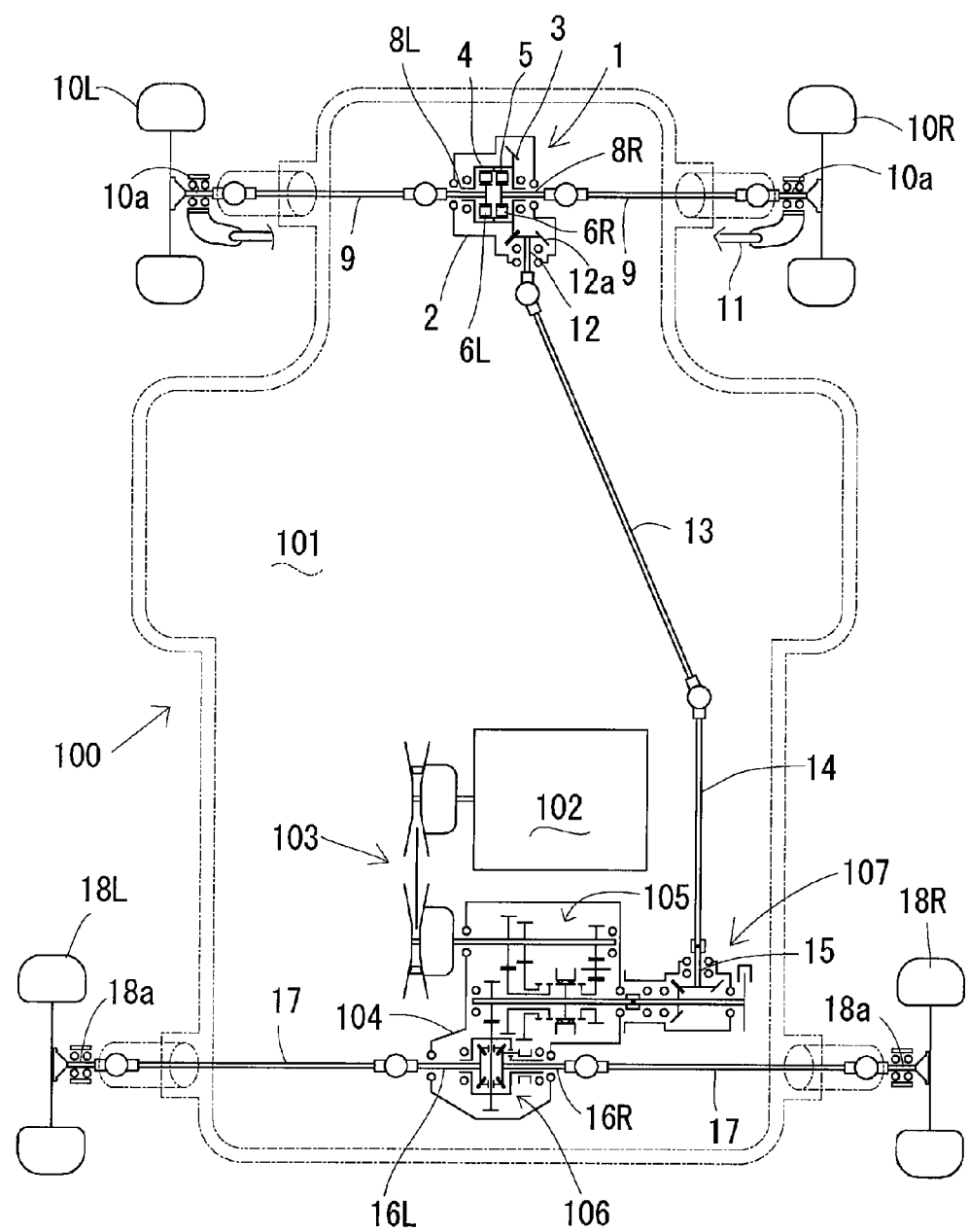
FIG. 1 is a schematic plan view of a four-wheel vehicle equipped with a bi-directional overrunning clutched differential unit according to the present invention.

A vehicle 100 equipped with a bi-directional overrunning clutched differential unit 1 will be described with reference to FIG. 1. Vehicle 100 is a truck or utility vehicle equipped at a rear portion thereof with a cargo (not shown). An engine 102 and a rear transaxle 104 are mounted on a frame 101 of vehicle 100. A belt-type continuously variable transmission (CVT) 103 serving as a main transmission is interposed between an output shaft of engine 102 and an input shaft of rear transaxle 104. Rear transaxle 104 incorporates a gear transmission 105, a differential gear unit 106 and a power takeoff 107. Gear transmission 105 serves as a sub transmission downstream of CVT 103. Gear transmission 105 functions as a reverser for switching the forward/backward traveling direction and as a high-low speed switching speed change system. Differential gear unit 106 is driven by gear transmission 105, and power takeoff 107 takes off power from gear transmission 105. Rear transaxle 104 journals right and left rear output shafts 16R and 16L differentially connected to each other through differential gear unit 106. Right and left rear wheels 18R and 18L are elastically suspended from respective right and left ends of frame 101, and include respective axles 18a drivingly connected to respective right and left rear output shafts 16R and 16L through respective transmission shafts 17 with constant velocity joints (CVJ).

A front portion of frame 101 supports bi-directional overrunning clutched differential unit 1 for driving right and rear front wheels 10R and 10L. Differential unit 1 comprises a differential housing 2, in which a bi-directional overrunning clutch of differential unit 1 includes a clutch housing 4, a common cage 5 disposed in clutch housing 4, and right and left rollers 6R and 6L (generally named as "rollers 6") held by cage 5.

Right and left front output shafts (hereinafter, simply referred to as "output shafts") 8R and 8L are inserted at axially proximal end portions thereof into cage 5, are journalled by differential housing 2, and are drivingly connected at axially distal ends thereof to axles 10a of respective right and left front wheels 10R and 10L through respective transmission shafts 9 with CVJ. Right and left front wheels 10R and 10L are steerable wheels elastically suspended from respective right and left ends of frame 101. Right and left front wheels 10R and 10L are operatively connected to each other through a tie rod 11, and at least one of front wheels 10R and 10L is mechanically linked to an unshown steering operation device, so that both of front wheels 10R and 10L are steered by manipulating the steering operation device.

A bevel ring gear 3 is fixed on clutch housing 4 in differential housing 2. Differential housing 2 journals an input shaft 12 at a rear portion thereof. In differential housing 2, input shaft 12 is provided at a front end thereof with a bevel gear 12a meshing with bevel ring gear 3. A rear end portion of input shaft 12 projects rearward from differential housing 2. On the other hand, a power takeoff shaft 15 projects forward from power takeoff 107 of rear transaxle 104 so as to be drivingly connected to input shaft 12 through propeller shafts 14 and 13. In this way, a part of the power of rear transaxle 104 for driving rear wheels 18R and 18L is transmitted to input shaft 12 of differential unit 1, and further to clutch housing 4 through bevel gear 12a and ring gear 3.

When the overrunning clutch of differential unit 1 is engaged in a later-discussed on-demand mode, the rotary power of clutch housing 4 is transmitted to right and left output shafts 8R and 8L through the engaged overrunning clutch and to right and left front wheels 10R and 10L. At this time, vehicle 100 travels in a four-wheel drive mode where all the four wheels 18R, 18L, 10R and 10L are driven. When the overrunning clutch of differential unit 1 is disengaged, the rotary power of clutch housing 4 is prevented from being transmitted to right and left front wheels 10R and 10L, whereby vehicle 100 travels in a two-wheel drive mode where only rear wheels 18R and 18L are driven.

Vehicle 100 is designed so that, in the on-demand mode, the rotation speed of output shafts 8R and 8L with front wheels 10R and 10L rotated by a force from a ground according to the movement of vehicle 1 normally cruising by rotating rear wheels 18R and 18L driven by the output power of rear transaxle 104 is slightly larger than the rotation speed of clutch housing 4 receiving power through power takeoff 107 from gear transmission 105 driven by engine 102. While the rotation speed of output shafts 8R and 8L exceeds the rotation speed of clutch housing 4, the overrunning clutch is disengaged. Thus, vehicle 100 travels in the two-wheel drive mode during its normal cruising so as to ensure smooth steerability and high fuel efficiency.

When vehicle 100 travels on a bad road and rear wheels 18R and 18L slip, the rotation speed of output shafts 8R and 8L caused by the movement of vehicle 100 is less than the rotation speed of clutch housing 4, and then the overrunning clutch of differential unit 1 is engaged. In other words, vehicle 100 travels in the four-wheel drive mode so that front wheels 10R and 10L also receive the engine power, thereby ensuring swift acceleration or quick escape from the slipping state.

Further, regardless of whether vehicle 100 travels forward or backward, vehicle 100 normally travels in the two-wheel drive mode and is changed into the four-wheel drive mode on demand only when rear wheels 18R and 18L slip because the overrunning clutch of differential unit 1 is a bi-directional overrunning clutch.

Differential unit 1 is provided with a later-discussed actuator 50 (see FIG. 4), which is switchable between an on-demand position and a non-on-demand position. When actuator 50 is set at the non-on-demand position, differential unit 1 is set in the non-on-demand mode where the overrunning clutch does not function. When actuator 50 is set at the on-demand position, differential unit 1 is set in the on-demand mode where the overrunning clutch functions on demand as mentioned above.

A first embodiment of differential unit 1 will be described with reference to FIGS. 2 to 11. In the hereinafter description, words "axial" and "axially" are defined as based on the axial direction of output shafts 8R and 8L, and words "peripheral" and "peripherally" are defined as based on the peripheral direction centered on the axis of output shafts 8R and 8L.

Figure 2:
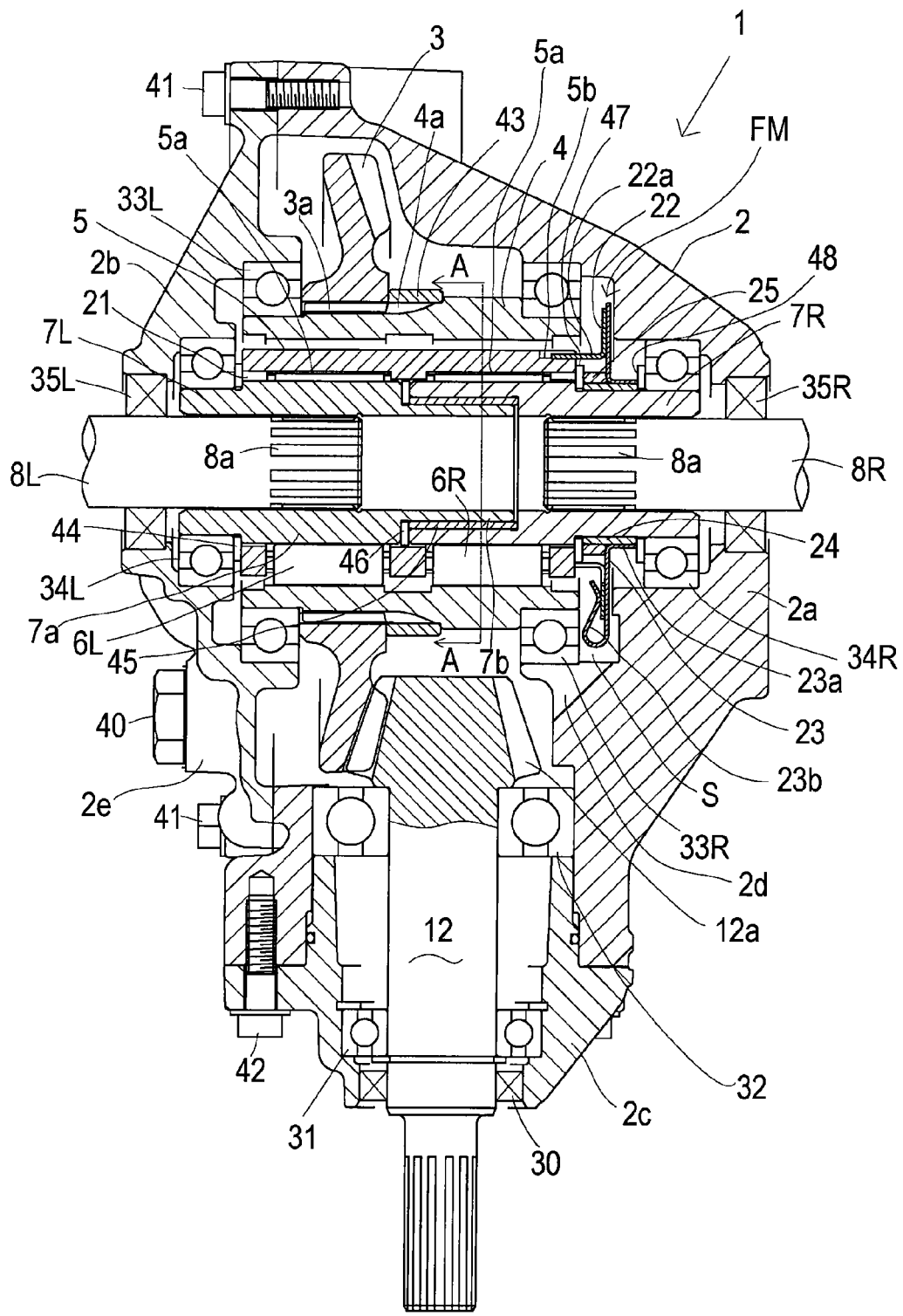
FIG. 2 is a sectional plan view of a bi-directional overrunning clutched differential unit according to a first embodiment of the present invention.
Figure 3:
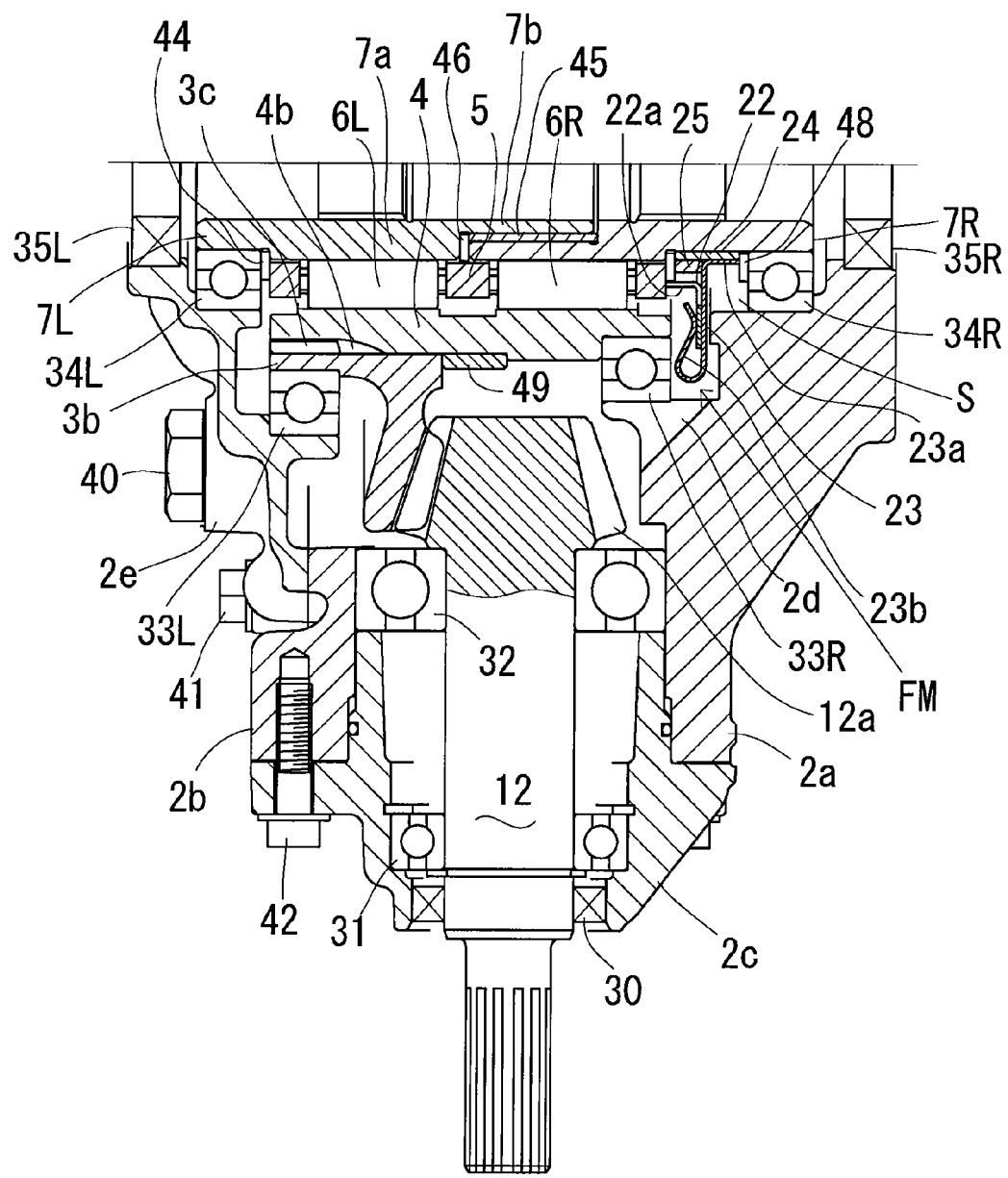
FIG. 3 is a sectional plan view of an enlarged rear portion of the differential unit according to the first embodiment, showing another structure supporting a ring gear and a clutch housing.
Figure 4:
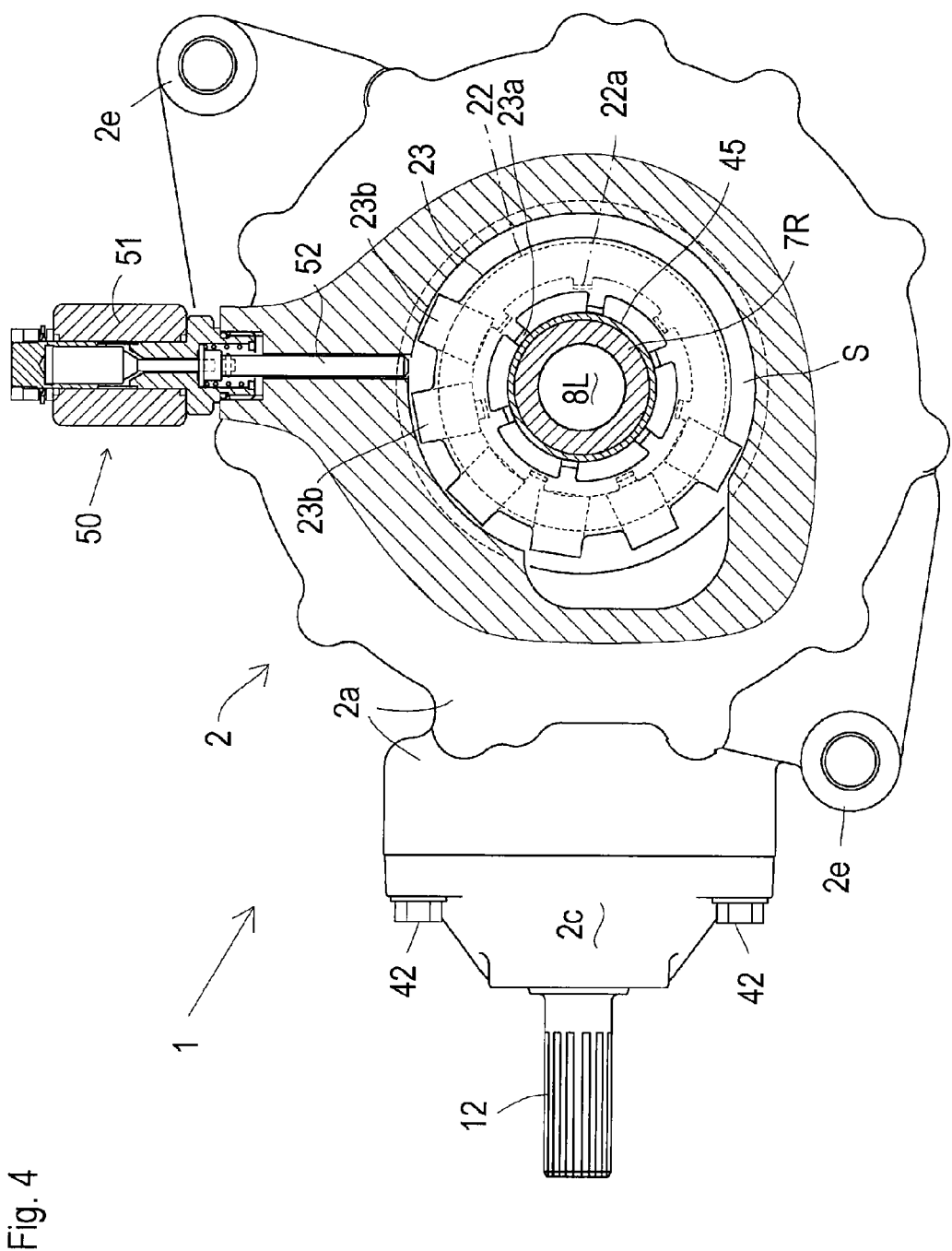
FIG. 4 is a right side view sectional in part of the differential unit according to the first embodiment, showing an actuator.

First, a structure of differential housing 2 will be described mainly with reference to FIGS. 2 to 4. Differential housing 2 is an assembly of a main housing body 2a, a side cover 2b and an input shaft cover 2c. Main housing body 2a journals one of output shafts 8R and 8L (in this embodiment, right output shaft 8R). Side cover 2b journals the other of output shafts 8R and 8L (in this embodiment, left output shaft 8L). Input shaft cover 2c journals input shaft 12. Main housing body 2a and side cover 2b are joined to each other along a joint surface perpendicular to the axes of output shafts 8R and 8L, and are fastened to each other by bolts 41. Main housing body 2a includes an end surface having an opening for passing input shaft 12, and input shaft cover 2c is fastened to the end surface of main housing body 2a by bolts 42. Further, main housing body 2a is formed integrally with mount bosses 2e as shown in FIG. 4, so that differential housing 2 can be fixed to frame 101 of vehicle 100 by bolts 40 screwed through respective mount bosses 2e as shown in FIGS. 2 and 3.

For convenience, the hereinafter description about the structure of differential unit 1 is based on the assumption that side cover 2b serves as a left cover, and input shaft cover 2c serves as a rear cover.

Differential housing 2 constituted by assembling main housing body 2a and covers 2b and 2c is filled therein with lubricating fluid. In this regard, an outward opening of main cover 2a for passing output shaft 8R, an outward opening of side cover 2b for passing output shaft 8L and the outward opening of input shaft cover 2c for passing input shaft 12 are fitted therein with respective oil seals 35R, 35L and 30 so as to prevent oil leakage in differential housing 2.

Fore-and-aft extended input shaft 12 is journalled at an axial intermediate portion thereof by a rear end portion of input shaft cover 2c through a ball bearing 31, and is journalled at a front portion thereof by a rear portion of main housing body 2a through a ball bearing 32. Oil seal 30 is fitted in the rear end opening of input shaft cover 2c around input shaft 12 to provide a fluid-tight seal.

Laterally axial cylindrical clutch housing 4 is journalled at a right end thereof by main housing body 2a through a ball bearing 33R, and is journalled at a left end thereof by side cover 2b through a ball bearing 33L. In this way, clutch housing 4 is journalled at the right and left opposite ends thereof by respective ball bearings 33R and 33L, so as to surely prevent it from being decentered during its rotation, in comparison with a clutch housing journalled at only an axial intermediate portion thereof by only a bush or in comparison with a clutch housing journalled at one end thereof by a bush and at the other end thereof by a ball bearing. Therefore, the rigidity of clutch housing 4 as well as the rigidity for supporting relevant members disposed outside and inside of clutch housing 4 is improved.

FIGS. 2 and 3 illustrate different structures for supporting clutch housing 4 and ring gear 3. Referring to FIG. 2, a spline 4a is formed on an outer peripheral surface of a left portion of clutch housing 4. A spline 3a is formed on an inner peripheral surface of ring gear 3 and meshes with spline 4a adjacently rightward of ball bearing 33L so as to relatively unrotatably engage ring gear 3 to clutch housing 4. A spacer 43 is spline-fitted to spline 4a adjacently rightward of ring gear 3, so that ring gear 3 is axially unslidably retained on clutch housing 4 between spacer 43 and ball bearing 33L.

Referring to FIG. 3, a left half portion of clutch housing 4 is slightly diametrically smaller than a right portion of clutch housing 4 on the axially proximal (left) side of ball bearing 33R. Ball bearing 33L is slightly diametrically larger than ball bearing 33R. Therefore, a gap is ensured between an inner peripheral surface of ball bearing 33L and an outer peripheral surface of the left end portion of clutch housing 4 in ball bearing 33L. Clutch housing 4 is formed on the outer peripheral surface of the left end portion thereof with a spline 4b. Ring gear 3 is fixed on the outer peripheral surface of the diametrically smaller left half portion of clutch housing 4. In this embodiment, a central boss portion 3b of ring gear 3 is extended leftward so as to be fitted at the left end portion thereof into the gap between the inner peripheral surface of ball bearing 33L and the outer peripheral surface of the left end portion of clutch housing 4, so that a spline 3c formed on the left end portion of central boss portion 3b of ring gear 3 is engaged to spline 4b of clutch housing 4. Clutch housing 4 has a step on the outer peripheral surface thereof between the diametrically smaller left half portion thereof and the diametrically larger right portion thereof. A spacer 49 is fitted on the outer peripheral surface of clutch housing 4 between the step and the right end of ring gear 3, so as to locate ring gear 3 in the axial direction. In this way, ring gear 3 and clutch housing 4 are engaged together into ball bearing 33L so as to increase the rigidity of clutch housing 4 and ring gear 3 for their integral rotatablility.

Cylindrical cage 5, which is diametrically smaller than clutch housing 4 and is axially substantially as long as clutch housing 4, is disposed coaxially in clutch housing 4. Roller holes 5a are formed in a left portion of cage 5 and are aligned at regular intervals along the periphery of cage 5, and left rollers 6L are held in respective roller holes 5a formed in the left portion of cage 5. On the other hand, roller holes 5a are also formed in a right portion of cage 5 and are aligned at regular intervals along the periphery of cage 5, and rollers 6R are held in respective roller holes 5a in the right portion of cage 5. The structure of cage 5 and the structure for supporting rollers 6R and 6L in cage 5 will be detailed later. The diameter of each of rollers 6R and 6L is larger than the thickness of cage 5, so that rollers 6R and 6L touch the inner peripheral surface of clutch housing 4, right rollers 6R touch the outer peripheral surface of right hub 7R, and left rollers 6L touch the outer peripheral surface of left hub 7L.

A left hub 7L is relatively unrotatably spline-fitted onto a spline 8a formed on an axially proximal end portion of left output shaft 8L. The axially proximal end portion of left output shaft 8L with left hub 7L thereon is inserted into cage 5 through a left end opening of cage 5. On the other hand, a right hub 7R is relatively unrotatably spline-fitted onto a spline 8a formed on an axially proximal end portion of right output shaft 8R. The axially proximal end portion of right output shaft 8R with right hub 7R thereon is inserted into cage 5 through a right end opening of cage 5.

A left end portion of left hub 7L projects leftward from the left end of cage 5, so as to be journalled by side cover 2b through a ball bearing 34L which is diametrically smaller than ball bearing 33L. Ball bearing 34L is adjoined to the left end of cage 5 through only a washer 44 fitted on left hub 7L. In other words, ball bearing 34L is axially outwardly adjoined to the left ends of cage 5 and clutch housing 4 and ball bearing 33L in the axial direction of output shafts 8R and 8L. Left output shaft 8L is extended leftward from the left end of left hub 7L, and projects outward through the opening in the left end portion of side cover 2b. Oil seal 35L is fitted in the opening around left output shaft 8L to provide a fluid tight seal.

On the other hand, right hub 7R is extended at a considerably axially long portion thereof rightward from the right end of cage 5, and is journalled at a right end thereof by main cover 2a through a ball bearing 34R which is diametrically smaller than ball bearing 33R and is diametrically as large as ball bearing 34L. Ball bearing 34R is considerably distant from the right end of cage 5 in the axial direction of output shafts 8R and 8L, so as to ensure a space S in main housing body 2a between ball bearing 34R and the right ends of clutch housing 4 and cage 5 with ball baring 33R. The rightward extended portion of right hub 7R from the right end of cage 5 is passed through space S, and a later-discussed friction mechanism FM is disposed in space S around the rightward extended portion of right hub 7R. Right output shaft 8R is extended rightward from the right end of right hub 7R and projects outward through the opening in the right end portion of main housing body 2a. Oil seal 35R is fitted in the opening around right output shaft 8R to provide a fluid tight seal. As shown in FIG. 4, later-discussed actuator 50 is attached to main housing body 2a of differential housing 2 so as to face friction mechanism FM in space S.

As shown in FIGS. 2 and 3, a wall of main housing body 2a supporting an outer ring of ball bearing 33R is partly notched to form a lubricating fluid introduction port 2d opened to space S. Friction mechanism FM in space S generates heat so as to increase the temperature of fluid collected in space S. However, as a result of lubricating fluid introduction port 2d, the fluid in space S is constantly intermingled with the lubricating fluid filled in differential housing 2 so as to prevent the fluid collected in space S from being excessively heated.

Each of right and left hubs 7R and 7L include a main portion 7a having a radially thickness, such as to contact rollers 6L or rollers 6R at an outer peripheral surface thereof. In cage 5, main portion 7a of left hub 7L faces left rollers 6L, and main portion 7a of right hub 7R faces right rollers 6R. An insertion portion 7b, which is diametrically smaller than main portion 7a, is formed on the axially proximal (right) end of left hub 7L and is inserted into the axially proximal (left) end portion of right hub 7R along the inner peripheral surface of right hub 7R. A bush 45 is interposed between the inner peripheral surface of the left end portion of right hub 7R and the outer peripheral surface of insertion portion 7b of left hub 7L. A step is formed on left hub 7L between main portion 7a thereof and insertion portion 7b. A washer 46 is fitted on the outer peripheral surface of insertion portion 7b and is interposed between a vertical end surface of the step and a vertical left end surface of left hub 7b. In this way, right and left coaxial hubs 7R and 7L are disposed relatively rotatably and is prevented from being decentering from each other. Thus, right and left output shafts 8R and 8L are surely kept coaxially and relatively rotatably to each other.

Alternatively, right hub 7R journalled by main housing body 2a may be formed on the axially proximal end thereof with a diametrically small insertion portion 7b to be inserted into the axially proximal end portion of left hub 7L journalled by side cover 2b.

To prevent decentering of right and left output shafts, it may be noticed that one output shaft is formed with an insertion portion to be relatively rotatably inserted into the other output shaft. However, in this case, the splined axially proximal end portions of the output shafts become adjacent to each other in right and left hubs so as to be insufficiently lubricated by oil in the differential housing, thereby being worn at mutually meshing portions thereof or being rusted. In the present embodiment, output shafts 8R and 8L are not configured so that one is inserted into the other, however, hubs 7R and 7L are configured so that one is inserted into the other. Further, hubs 7R and 7L are extended axially proximally from the axially proximal ends of respective output shafts 8R and 8L, so as to have a sufficiently large space therein between the axially proximal ends of output shafts 8R and 8L formed with splines 8a to be filled with lubricating fluid. Therefore, splines 8a on the outer peripheral surfaces of output shafts 8R and 8L and the corresponding splines on the inner peripheral surfaces of hubs 7R and 7L are supplied with sufficient lubricating fluid.

Figure 5:
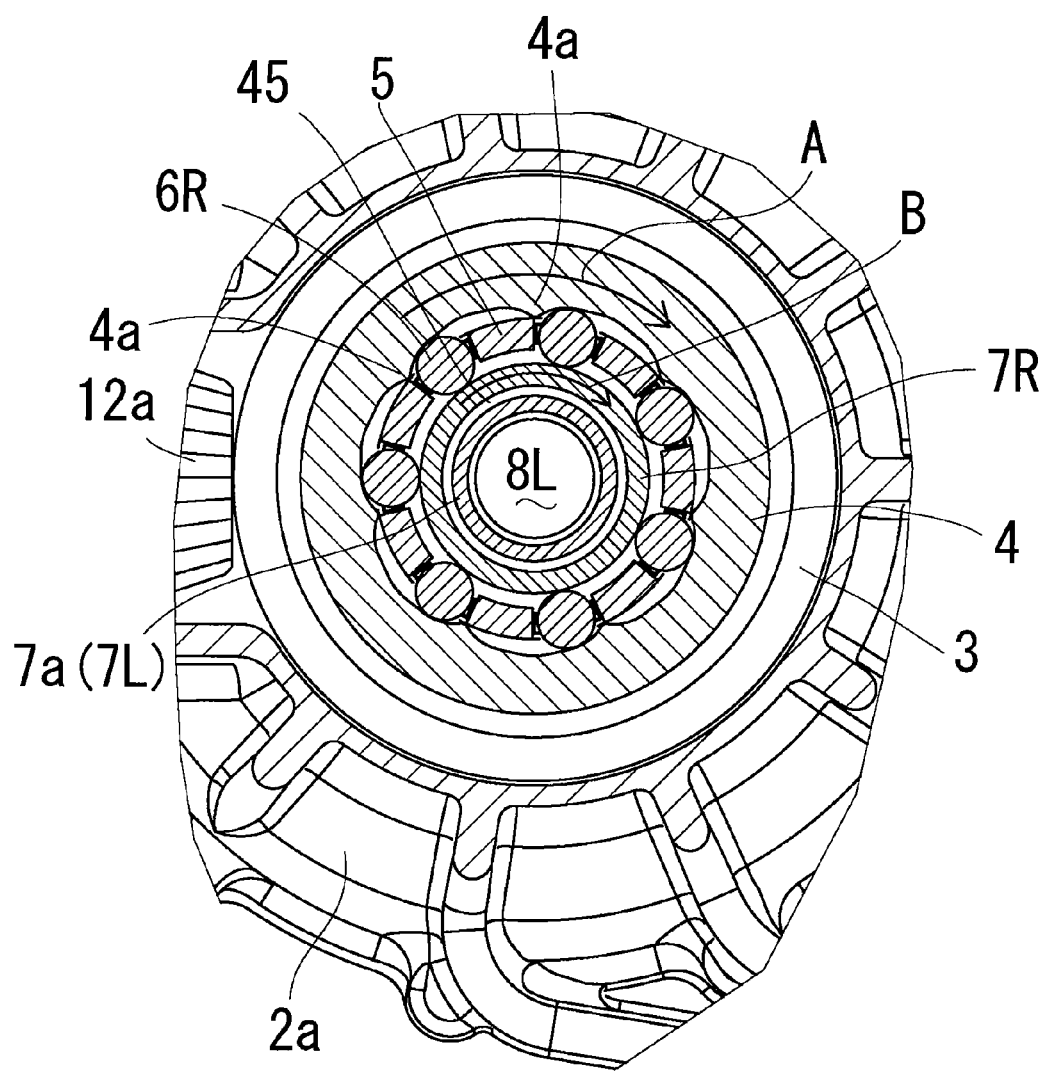
FIG. 5 is a cross sectional view taken along A-A line of FIG. 2, when the actuator is set at an on-demand position.
Figure 6:
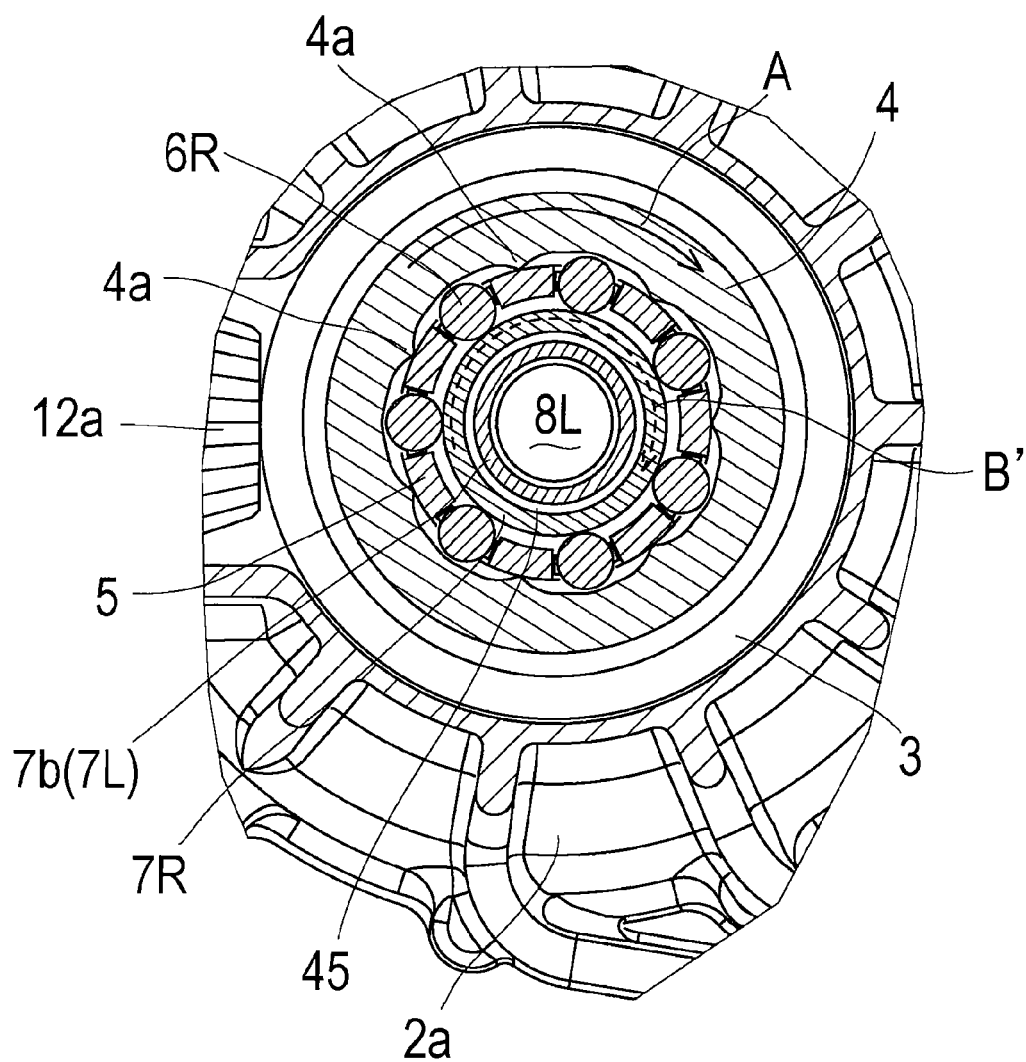
FIG. 6 is a cross sectional view taken along A-A line of FIG. 2, when the actuator is set at a non-on-demand position.

The structure of the bi-directional overrunning clutch of the differential unit, comprising clutch housing 4, cage 5, rollers 6 and hubs 7 will be described mainly with reference to FIGS. 5 and 6. In relation to FIG. 2, each of FIGS. 5 and 6 shows right rollers 6R, right hub 7R contacting right rollers 6R, and insertion portion 7b of left hub 7L in right hub 7R, thereby indicating the bi-directional overrunning clutch for right output shaft 8R. However, in the hereinafter description, roller 6 is (or rollers 6 are) referred to as the representative to right and left rollers 6R and 6L, and hub 7 is (or hubs 7 are) referred to as the representative to right and left hubs 7.

Radially inward V-shaped (when axially viewed) expansions are formed on the inner peripheral surface of clutch housing 4 at regular intervals along the periphery of clutch housing 4 so as to serve as cams 4a, each of which is disposed between each pair of peripherally adjoining rollers 6. As a result of the V-shape, each cam 4a has symmetric sloped surfaces with respect to the radial centerline thereof. Accordingly, in the rotation direction of output shafts 8R and 8L, each roller 6 has a sloped surface of cam 4a immediately therebefore and a sloped surface of cam 4a immediately thereafter.

A change of conditions of the bi-directional overrunning clutch during traveling of vehicle 100 will be described on the assumption that actuator 50 is set at the on-demand position.

When input shaft 12 receives power from power takeoff 107 of rear transaxle 104, ring gear 3 and clutch housing 4 are rotated. As a result of actuator 50 being set at the on-demand position, friction mechanism FM applies a frictional rotation resistance onto cage 5, so that, as shown in FIG. 5, rollers 6 are pushed by the sloped surfaces of respective cams 4a immediately thereafter in the rotation direction of clutch housing 4, thereby rotating cage 5 following clutch housing 4. Incidentally, FIG. 5 is based on the assumption that hubs 7 rotate clockwise during the forward traveling of vehicle 100. During the backward traveling of vehicle 100, in FIG. 5, hubs 7 rotate counterclockwise so that each roller 6 contacts the sloped surfaces of cam 4a opposite to cam 4a illustrated as contacting roller 6 in the rotation direction.

In this state, when rear wheels 18R and 18L slip, the rotation speed of hubs 7 contacting rollers 6 becomes less than the rotation speed of clutch housing 4. In this regard, in FIG. 5, a full-lined arrow B indicating the rotation direction of hubs 7 is shorter than an arrow A indicating the rotation direction of clutch housing 4, and this illustration means that the rotation speed of hubs 7 is less than the rotation speed of clutch housing 4. Therefore, each roller 6 receiving the pressure from the sloped surface of contacting cam 4a receives a pressure from hub 7 relatively opposite to the pressure from contacting cam 4a, so that the sloped surface of each cam 4a presses each roller 6 against hub 7 in the radial direction of cage 5, thereby wedging up each roller 6 between each cam 4a and hub 7. This condition is defined as the engagement state of the bi-directional overrunning clutch such as to transmit the rotary force of clutch housing 4 to hub 7 and corresponding output shaft 8R or 8L through rollers 6.

When vehicle 100 escapes from the slipping state of rear wheels 18R and 18L and normally travels, the rotation speed of hubs 7 exceeds the rotation speed of clutch housing 4. In this regard, in FIG. 6, a dotted-lined arrow B' indicating the rotation direction of hubs 7 is longer than arrow A indicating the rotation direction of clutch housing 4, and this illustration means that the rotation speed of hubs 7 exceeds the rotation speed of clutch housing 4. Accordingly, each roller 6 rotates following hub 7 freely from the pressure of the sloped surface of cam 4a, i.e., freely from the wedging. Accordingly, hub 7 and corresponding output shaft 8R or 8L rotate according to the movement of vehicle 100 free from the power of power takeoff 107 of rear transaxle 104, so as to rotate cage 5 along with the rotation thereof. This condition is defined as the disengagement state of the bi-directional overrunning clutch.

When actuator 50 is set at the non-on-demand position, the frictional rotation resistance of friction mechanism FM against cage 5 is eliminated. In this state, cage 5 with rollers 6 contacting hub 7 rotates following hub 7 without resistance, so that, as shown in FIG. 6, each roller 6 is disposed at each recess formed between the sloped surfaces of every pair of cams 4a neighboring in the peripheral direction of clutch housing 4. Even if the rotation speed of hub 7 becomes less than the rotation speed of clutch housing 4, the rotatability of cage 5 without frictional resistance prevents each roller 5 from being wedged between cam 4a and hub 7. Consequently, the bi-directional overrunning clutch is constantly disengaged regardless of variation of the relative rotation speed of output shafts 8R and 8L to clutch housing 4.

Figure 7:
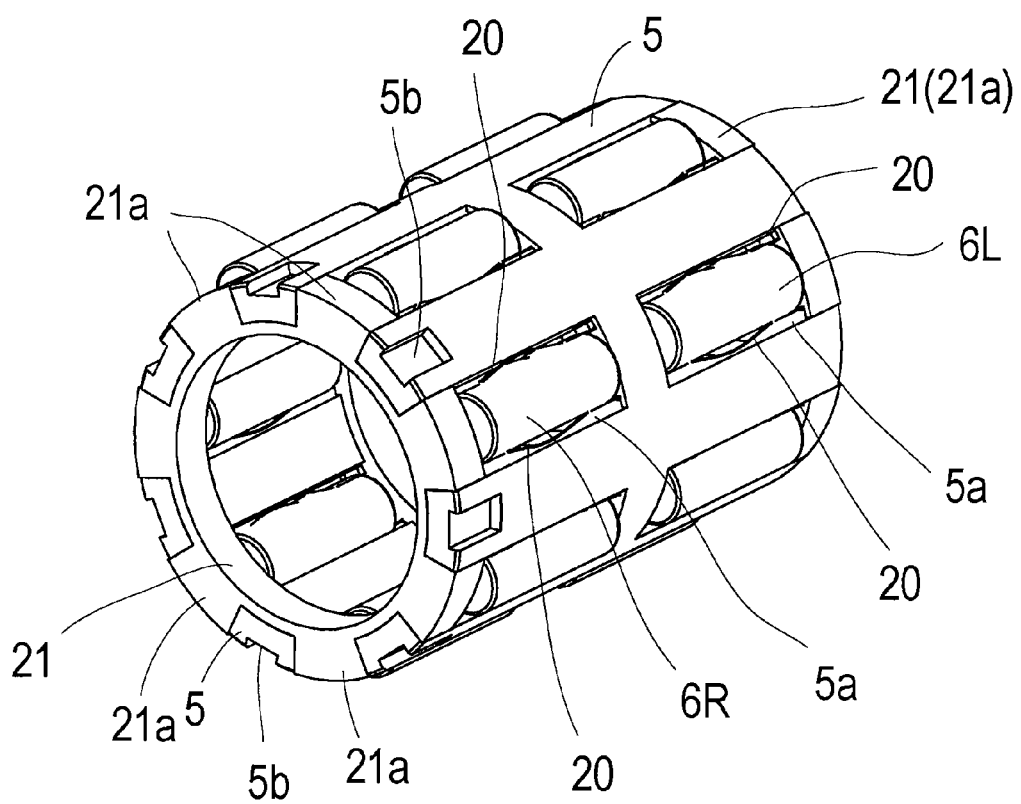
FIG. 7 is a perspective view of a cage holding rollers.
Figure 8:
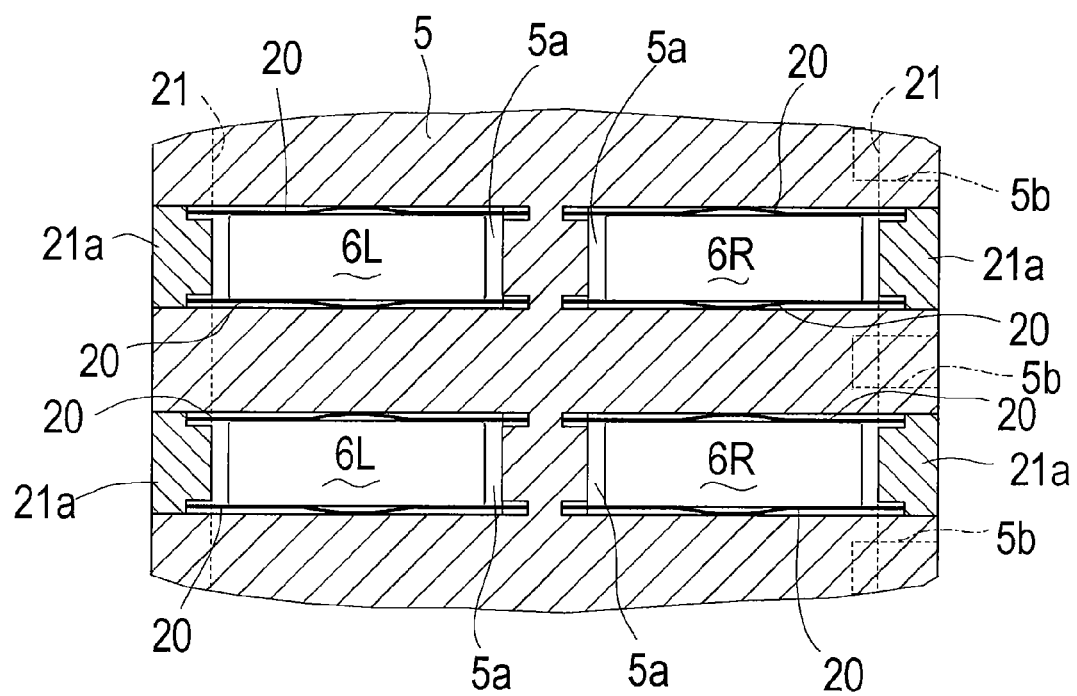
FIG. 8 is a sectional view of the cage holding the rollers when viewed perpendicular to the axis of the cage.
Figure 9:
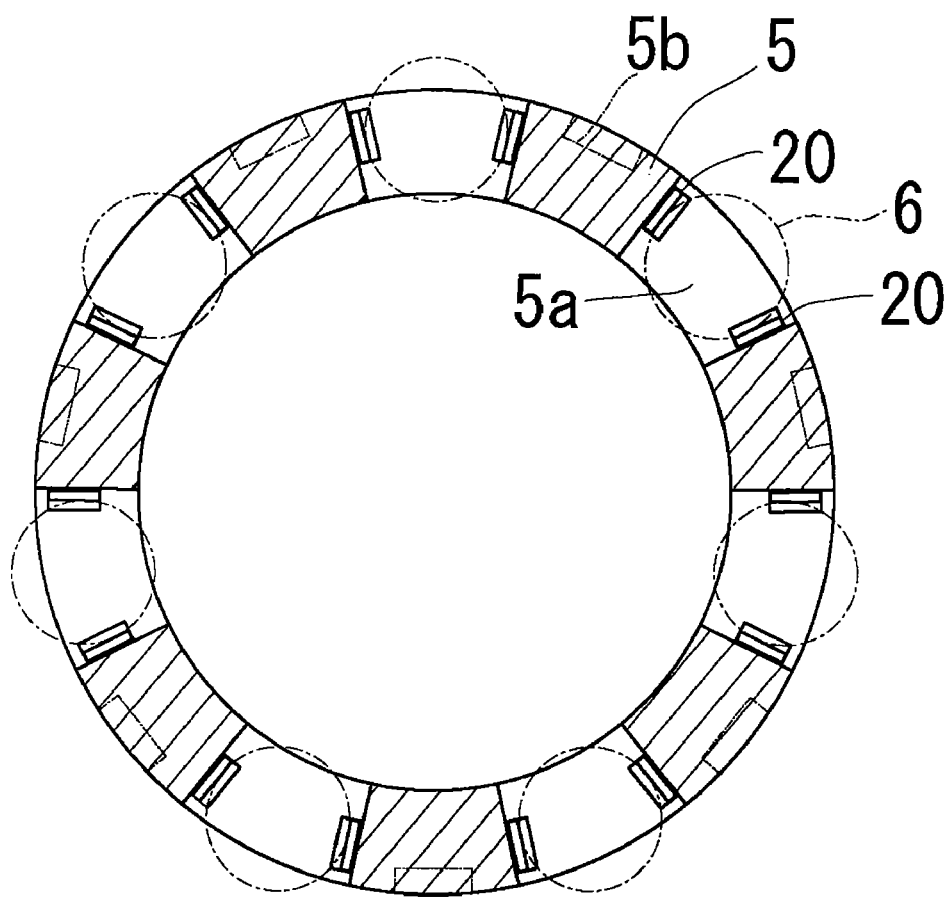
FIG. 9 is a sectional side view of the cage when viewed along the axis of the cage.
Figure 10:
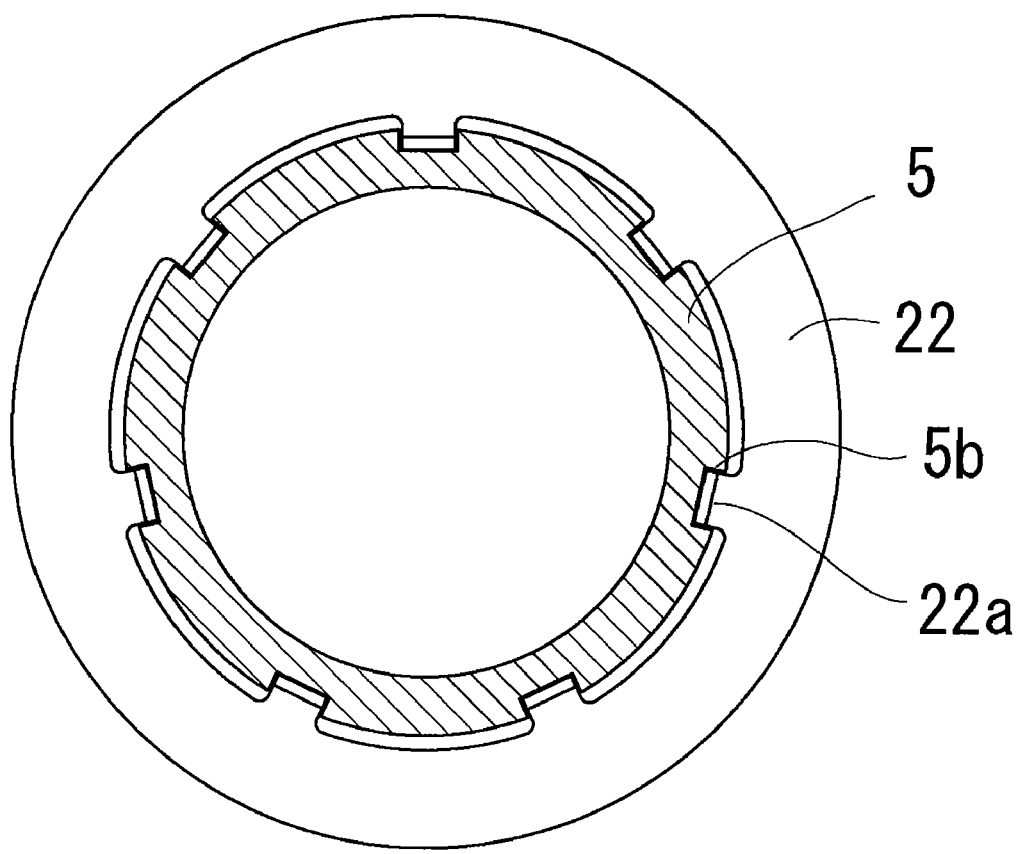
FIG. 10 is a left side view of a rotary frictional plate of a friction mechanism in the differential unit according to the first embodiment, including a sectional left side view of the cage engaged with the rotary frictional plate.
Figure 11:
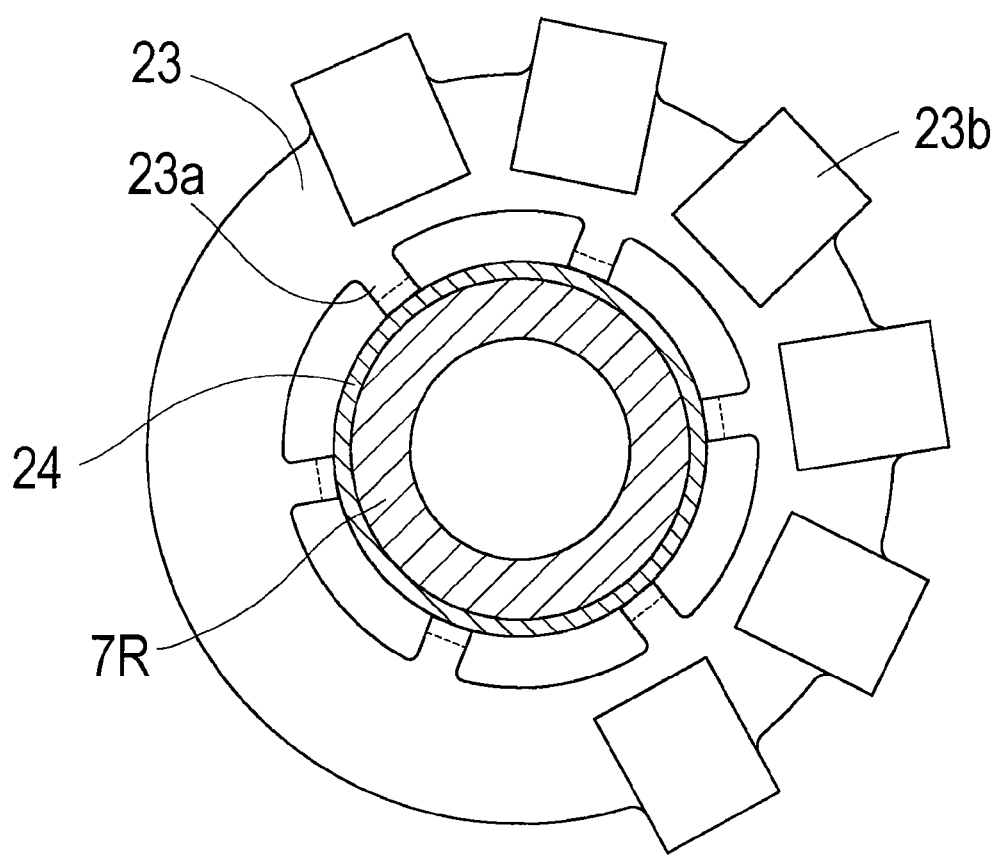
FIG. 11 is a left side view of a fixture frictional plate of the friction mechanism in the differential unit according to the first embodiment, including a sectional left side view of a hub fitting the fixture frictional plate.

A structure of cage 5 holding rollers 6 will be described with reference to FIGS. 7 to 9. As mentioned above, cage 5 is formed with plural roller holes 5a for holding respective rollers 6 at regular intervals along the periphery of cage 5. Each of roller holes 5a for holding respective left rollers 6L and each of roller holes 5a for holding respective right rollers 6R are aligned in the axial direction of cage 5. All roller holes 5a are opened outward at axially distal ends thereof. Rollers 6 and later-discussed spring plates 20 are fitted into respective roller holes 5a, and then, a pair of side cover rings 21 are disposed at axially opposite ends of cage 5, and cover portions 21a projecting radially outward from each side cover ring 21 are fitted into the distal end openings of respective roller holes 5a so as to prevent rollers 6 from escaping from respective roller holes 5a.

Each roller hole 5a has a pair of edge surfaces that are opposite to each other in the peripheral direction of cage 5 and are extended in parallel to the axial direction of cage 5. A pair of spring plates 20 are disposed on the respective opposite edge surfaces in each roller hole 5a. Each spring plate 20 is compressed and interposed between an outer peripheral surface of each roller 6 and each of the edge surfaces of each roller hole 5a. Each spring plate 20 is bent at a middle portion thereof, so that the bent middle portion of spring plate 20 is pressed against each of the opposite edge surfaces of cage 5 facing each roller hole 5a, and is pressed at opposite end portions thereof against the outer peripheral surface of each roller 6, thereby biasing each roller 6 toward the peripheral center of roller hole 5a.

In this regard, conventionally, each roller is formed with an annular groove at an axially intermediate portion thereof, a single linear spring is disposed around the left output shaft or the left hub so as to be fitted into the annular grooves of all the left rollers, and another single linear spring is disposed around the right output shaft or the right hub so as to be fitted into the annular grooves of all the right rollers. According to this conventional embodiment, while the cage is carried before it has the output shafts or hubs inserted thereinto, for example, the springs and rollers are liable to escape from the cage. To the contrary, in the present embodiment, the pair of spring plates 20 are provided to each roller hole 5a so as to hold each roller 6 so that spring plates 20 and rollers 6 hardly escape from cage 5.

Cage 5 is formed on an outer peripheral surface of one axial end (in this embodiment, right end) thereof with grooves 5b each of which is disposed between each pair of neighboring rollers 6. Grooves 5b are adapted to have respective engagement portions 22a of a later-discussed rotary friction plate 22 fitted thereinto.

Friction mechanism FM disposed in space S in main housing body 2a of differential housing 2 will be described with reference to FIGS. 2 to 4 and FIGS. 10 and 11. Friction mechanism FM includes rotary friction plate 22 fixed to cage 5, and a fixture friction plate 23 to be frictionally pressed against rotary friction plate 22. Both plates 22 and 23 are metal plates. Vertical ring-shaped rotary friction plate 22 is formed on the inner peripheral edge thereof with rectangularly bent portions serving as engagement portions 22a peripherally aligned at regular intervals. Engagement portions 22a are fitted into respective grooves 5b so as to relatively unrotatably (i.e., rotatably integrally) engage rotary friction plate 22 to cage 5.

A bush 24 is relatively rotatably fitted on an outer peripheral surface of a portion of right hub 7R projecting axially distally from cage 5 between the right end of cage 5 and ball bearing 34R. On this outer peripheral surface of right hub 7R, a washer 47 is interposed between bush 24 and the right end of cage 5, and a washer 48 is interposed between bush 24 and ball bearing 34R. Vertical ring-shaped fixture friction plate 23 is formed with contact portions 23a aligned at regular intervals on the inner peripheral edge thereof. Contact portions 23a are extended radially inward from the inner peripheral edge of fixture friction plate 23 and are rectangularly bent axially opposite to engagement portions 22a. Contact portions 23a contact the outer peripheral surface of bush 24 so that fixture friction plate 23 is relatively rotatably disposed around right hub 7R. Tips of contact portions 23a abut against washer 48, and a spacer 25 is interposed on the outer peripheral surface of bush 24 between washer 47 and fixture friction plate 23 so as to locate fixture friction plate 23 in the axial direction of output shafts 8R and 8L.

A main portion of fixture friction plate 23 contacts rotary friction plate 22. Plural pressure portions 23b, each of which has a predetermined width in the peripheral direction of fixture friction plate 23, project radially outward from a half outer peripheral edge of fixture friction plate 23, and are folded toward the rotary center of fixture friction plate 23, thereby being shaped as a clip having an elastic force. Therefore, fixture friction plate 23 nips rotary friction plate 22 between the main portion thereof and pressure portions 23b. In other words, as a result of pressure portions 23b, friction plates 22 and 23 are frictionally pressed against each other. In this way, friction mechanism FM is configured.

Actuator 50 will be described with reference to FIG. 4. Actuator 50 is an assembly integrally including a solenoid 51 and a spool 52 that is thrust or withdrawn according to whether or not solenoid 51 is energized.

Alternatively, actuator 50 may be a hydraulic actuator (not shown) configured so that spool 52 is connected to a piston in a hydraulic cylinder, and a fluid chamber/chambers in the hydraulic cylinder is/are selectively supplied with fluid by a solenoid valve.

Solenoid 51 is externally attached onto a top outer wall of main housing body 2a of differential housing 2 and is electrically connected to a controller (not shown). Alternatively, a mode-selection switch is provided adjacent to an operator's seat on vehicle 100 and is electrically connected to the controller so as to be optionally operated for selecting either excitation or non-excitation of solenoid 51, i.e., either the on-demand mode or the non-on-demand mode of differential unit 1. Spool 52 is extended from solenoid 51 into space S in main housing body 2a perpendicular to the axial direction of output shaft 8R.

When solenoid 51 is energized, a tip of spool 52 is thrust into a gap between any pair of pressure portions 23b neighboring in the peripheral direction of fixture friction plate 23. This is defined as the on-demand position of actuator 50. In this state, fixture friction plate 23 tends to rotate following rotary friction plate 22 and cage 5. However, one pressure portion 23a abuts against spool 52 so as to anchor fixture friction plate 23 to differential housing 2 through spool 52. Accordingly, rotary friction plate 22, when rotating together with cage 5, is fractionated between the main portion of unrotatably retained fixture friction plate 23 and its pressure portions 23b so as to apply a frictional rotation resistance onto cage 5 through rotary friction plate 22. Therefore, during the rotation of clutch housing 4 and hubs 7, each roller 6 contacts each the sloped surface of each cam 4a as shown in FIG. 5. In this state, as soon as the rotation speed of hubs 7 becomes less than the rotation speed of clutch housing 4, rollers 6 are wedged up as mentioned above, thereby engaging the overrunning clutch of differential unit 1. When the rotation speed of hubs 7 exceeds the rotation speed of clutch housing 4, rollers 6 still contact the sloped surfaces of respective cams 4a as shown in FIG. 5 because cage 5 with rotary friction plate 22 receives the frictional rotation resistance from fixture friction plate 23 retained by differential housing 2 through spool 52. However, rollers 6 are not wedged, so that hubs 7 are rotatable freely from the rotary force of clutch housing 4.

When solenoid 51 is not energized, the tip of spool 52 is withdrawn from pressure portions 23b so as to allow fixture friction plate 23 to rotate freely from spool 52. This is defined as the non-on-demand position of actuator 50. In this state, when cage 5 rotates according to rotation of clutch housing 4 and hubs 7, fixture friction plate 23 rotates integrally with rotary friction plate 22 engaged to cage 5. In other words, since friction mechanism FM does not apply the frictional rotation resistance onto cage 5, as shown in FIG. 6, each roller 6 is freely movable in the gap between corresponding neighboring cams 4a so as not to be wedged. Therefore, the bi-directional overrunning clutch of differential unit 1 does not function, i.e., it is constantly disengaged.

Figure 12:
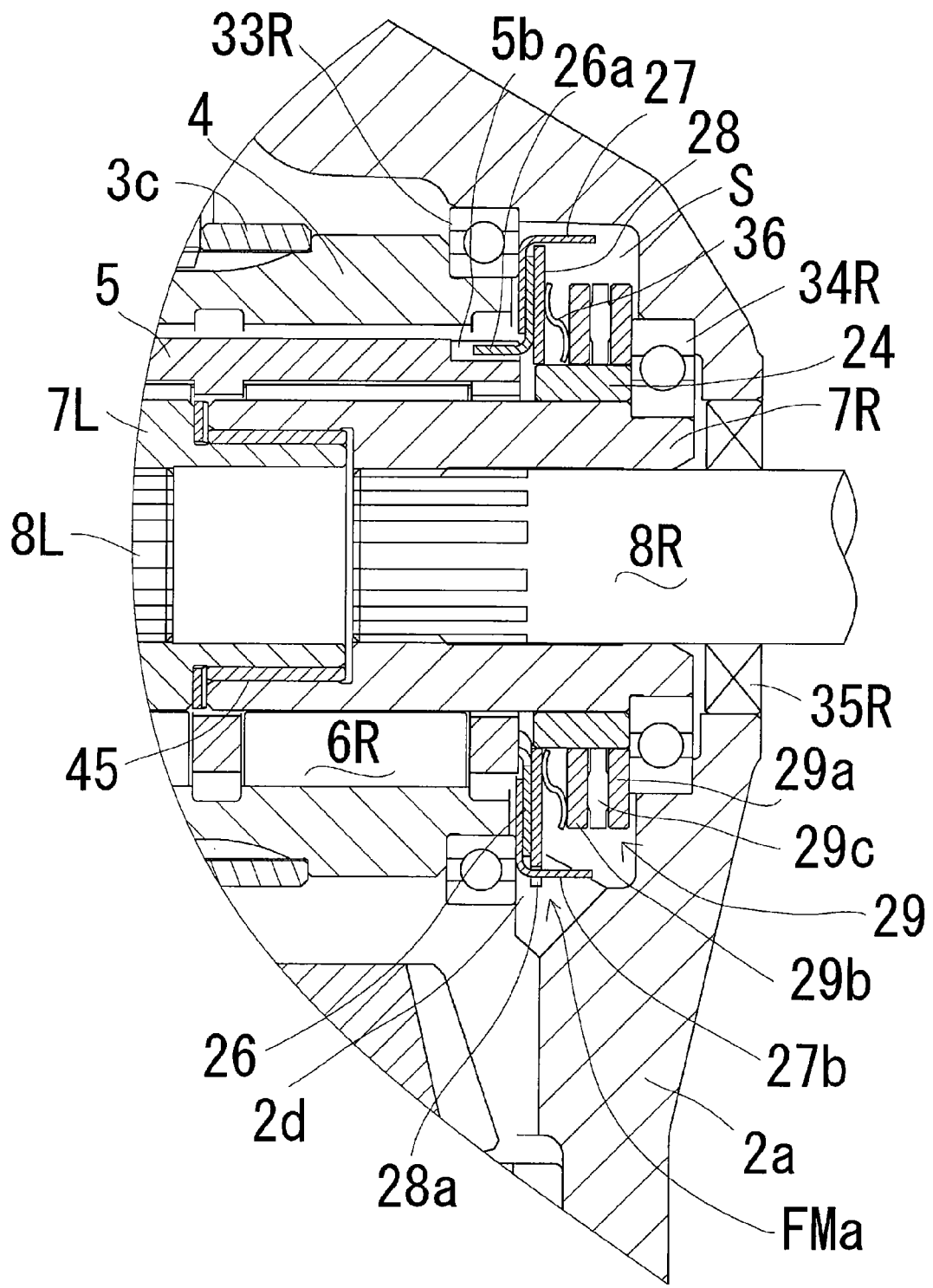
FIG. 12 is an enlarged fragmentary sectional plan view of the differential unit including an alternative friction mechanism.
Figure 13:
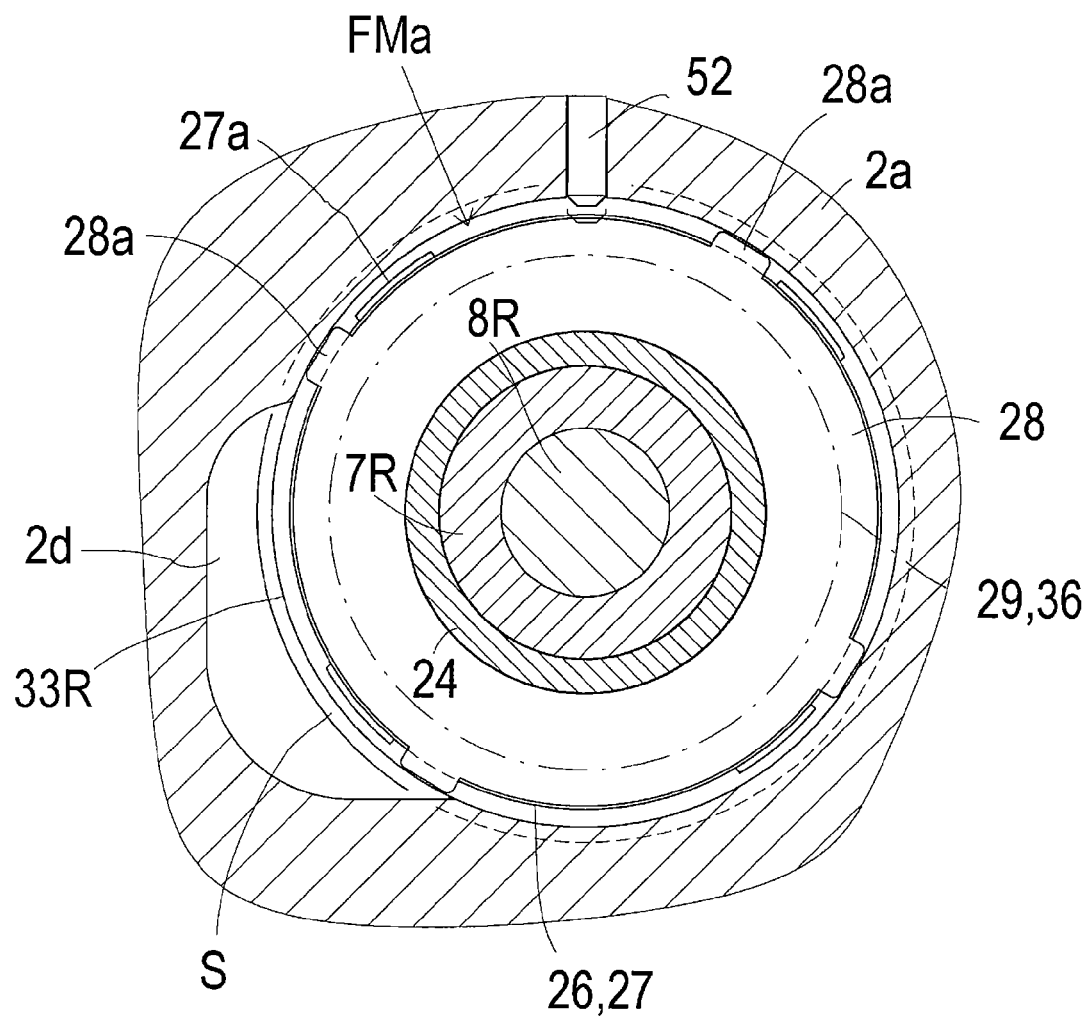
FIG. 13 is an enlarged sectional right side view of the differential unit of FIG. 12, showing the friction mechanism.

Referring to FIGS. 12 and 13, an alternative friction mechanism FMa disposed in space S of differential unit 1 will now be described. Friction mechanism FMa comprises entirely vertical ring-shaped friction plates 26, 27 and 28, a thrust bearing 29 and a wave washer 36, and is provided around the axially distal rightward extended portion of hub 7R in space S between bearings 33R and 34R.

Rotary friction plate 26 is disposed along the right end of clutch housing 4. Engagement portions 26a are axially proximally bent from an inner peripheral edge of rotary friction plate 26 and are engaged into respective grooves 5b formed on the right end of cage 5, so as to rotatably integrally engage rotary friction plate 26 to cage 5. Left fixture friction plate 27 and right fixture friction plate 28 press and nip rotary friction plate 26 therebetween. The mutually contact surfaces of plates 26, 27 and 28 may be provided thereon with layers having high frictional properties.

A vertical main portion of fixture friction plate 27 is disposed between the right end of clutch housing 4 and rotary friction plate 26, and contacts the inner ring of ball bearing 33R at an axially proximal side surface thereof. Bent portions 27a (four bent portions 27a, in this embodiment) are extended axially distally from the outer peripheral edge of the vertical main portion of fixture friction plate 27 so as to be aligned at regular intervals in the peripheral direction of fixture friction plate 27. The other fixture friction plate 28 is supported on collar 24 fitted on the extended portion of hub 7R. Projections 28a (four projections 28a, in this embodiment) are extended radially outward from the outer peripheral edge of fixture friction plate 28 so as to be aligned at regular intervals in the peripheral direction of fixture friction plate 28. Each projection 28a is disposed between each pair of neighboring bent portions 27a of fixture friction plate 27 so as to be able to contact corresponding bent portion 27a. When projections 28a contact respective bent portions 27a, fixture friction plates 27 and 28 are rotatably integrated with each other while nipping rotary friction plate 26 therebetween.

Thrust bearing 29 includes a pair of ring plates 29a and 29b and rollers 29c between ring plates 29a and 29b, and is provided on collar 24. Outer ring plate 29a contacts a side surface of the outer ring of ball bearing 34R. Wave washer 36 is interposed on collar 24 between fixture friction plate 28 and axially proximal ring plate 29b. As a result of thrust bearing 29 and wave washer 36, fixture friction plates 27 and 28 are pressed against the axially proximal and distal side surfaces of rotary friction plate 26. In this state, when spool 52 allows the rotation of fixture friction plate 27 as mentioned later, as a result of the contact of the axially proximal side surface of fixture friction plate 27 with the inner ring of ball bearing 33R, and as a result of thrust bearing 29, friction mechanism FMa does not function, i.e., cage 5 is allowed to rotate together with clutch housing 4. That is, differential unit 1 is set in the non-on-demand mode where the bi-directional running clutch does not function.

With regard to actuator 50, referring to FIG. 4, solenoid 51 is mounted on the top portion of main housing body 2a, and spool 52 extended from solenoid 51 is selectively thrust or withdrawn into and from space S incorporating friction mechanism FMa. When spool 52 abuts against bent portion 27a of fixture friction plate 27, the free rotatability of fixture friction plate 27 is restricted so that friction mechanism FMa functions. In this way, differential unit 1 is set in the on-demand mode where the bi-directional overrunning clutch functions. This bi-directional overrunning clutch is engaged only after the rotation speed of hubs 7R and 7L driven by wheels 10R and 10L running on a ground surface becomes less than the rotation speed of clutch housing 4 driven by engine 102.

A second embodiment of bi-directional overrunning clutched differential unit 1 will be described with reference to FIGS. 14 to 18. Differential unit 1 according to the second embodiment is different from differential unit 1 according to the first embodiment only in regard to the structure of an alternative friction mechanism FMb, the arrangement of actuator 50 and the structure of differential housing 2 concerned to the arrangement of actuator 50. Description of the other structures of differential unit 1 of the second embodiment will be omitted because they are the same as those of differential unit 1 of the first embodiment. Further, the positional relation between rollers 6 and cams 4a in the on-demand mode by setting actuator 50 at the on-demand position will be described with reference to FIG. 5, and that in the non-on-demand mode by setting actuator 50 at the non-on-demand position will be described with reference to FIG. 6.

In differential unit 1 according to the second embodiment, actuator 50 is mounted onto differential housing 2 so as to orient spool 52 parallel to output shafts 8R and 8L. In this regard, differential housing 2 includes covers 2f and 2g separably joined to each other so as to correspond to main housing body 2a of the first embodiment. Cover 2f supports ball bearing 33R, and cover 2g supports ball bearing 34R. Therefore, space S in differential housing 2 incorporating friction mechanism FMb can be opened by separating covers 2f and 2g from each other, thereby facilitating friction mechanism FMb in assembly and maintenance. Actuator 50 is attached to cover 2g, and solenoid 51 is disposed outside of cover 2g adjacently parallel to output shaft 8R. Spool 52 reciprocally penetrates cover 2g and is inserted at a tip thereof into space S.

Friction mechanism FMb of differential unit 1 according to the second embodiment includes a disc spring 61 and a rotary friction plate 62. Vertical ring-shaped rotary friction plate 62 is rotatably integrally engaged with cage 5. Disc spring 61 applies a frictional rotation resistance onto rotary friction plate 62. Similar to engagement portions 22a of rotary friction plate 22, engagement portions 62a are formed on the inner peripheral edge of rotary friction plate 62, and are fitted into respective grooves 5b on the right end of cage 5 so as to rotatably integrally engage rotary friction plate 62 to cage 5. A washer 64 contacts one (left) side surface of rotary friction plate 62, and a washer 65 contacts the other (right) side surface of rotary friction plate 62. Disc spring 61 is interposed between washer 64 and an inner wall surface of cover 2f of differential housing 2. Washer 65 is interposed between the side surface of rotary friction plate 62 and an inner wall surface of cover 2g of differential housing 2. Therefore, a certain friction force is constantly applied to cage 5 through rotary friction plate 62 so as to restrict the rotatability of cage 5, thereby constantly setting differential unit 1 in the on-demand mode.

In space S, a thrusting plate 63 is interposed between the tip of spool 52 of actuator 50 and rotary friction plate 62. Ring-shaped thrusting plate 63 is formed with engagement portions 63a which are extended radially inward from an inner peripheral edge of thrusting plate 63 and are rectangularly bent toward clutch housing 4 in the axial direction of output shafts 8R and 8L. Clutch housing 4 is formed on the right end thereof with grooves 4c corresponding to respective engagement portions 63a, similar to grooves 5b of cage 5 corresponding to respective engagement portions 62a.

Rotary friction plate 62 is formed with peripherally extended slots 62b corresponding to respective grooves 4c. Engagement portions 63a are passed through respective slots 62b and engaged into respective grooves 4c so as to relatively unrotatably and axially movably engage thrusting plate 63 to clutch housing 4. In rotary friction plate 62, each of slots 62b has the peripheral length that is sufficiently large for allowing movement of corresponding engagement portion 63a therein within a certain degree so as to allow rotary friction plate 62 to rotate relative to stopper plate 62.

Figure 15:
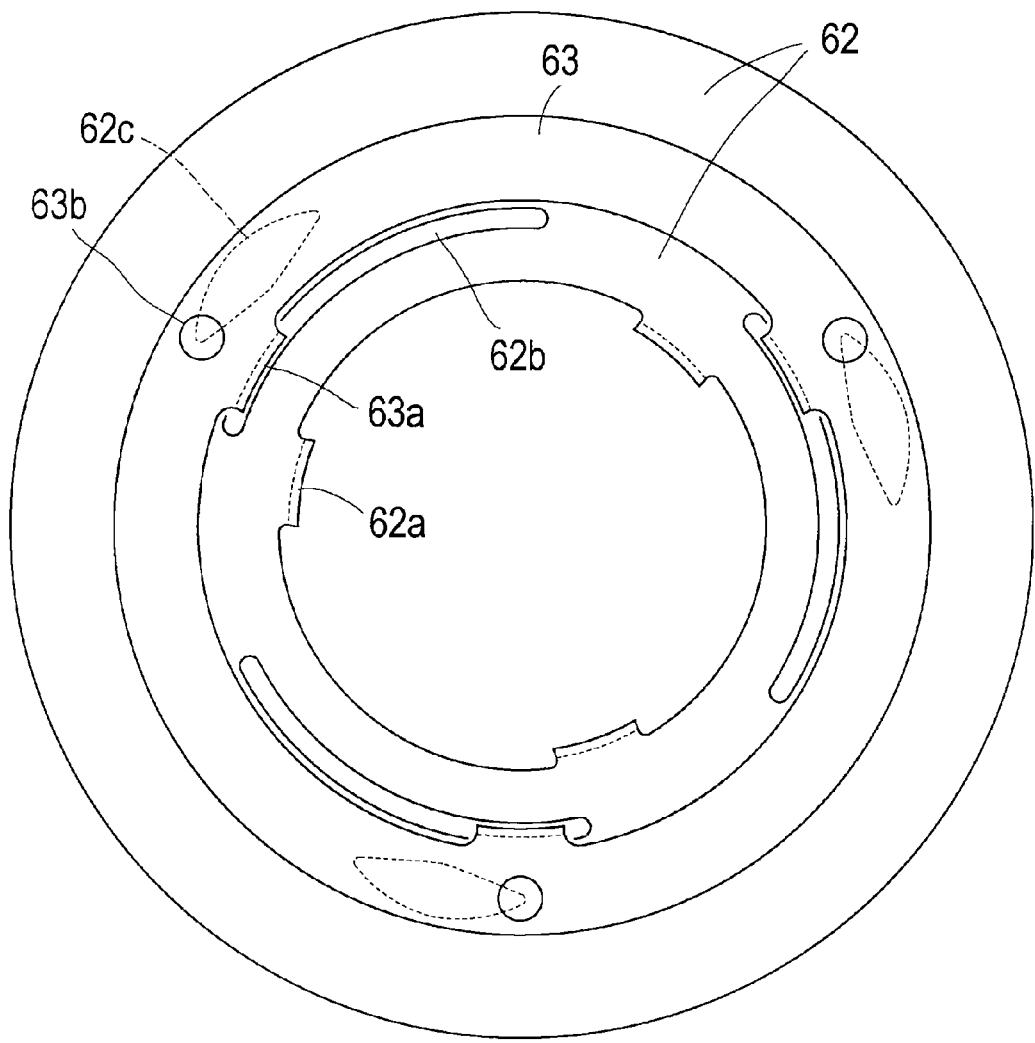
FIG. 15 is a side view of a friction mechanism of the differential unit according to the second embodiment when the actuator is set at the on-demand position.
Figure 16:
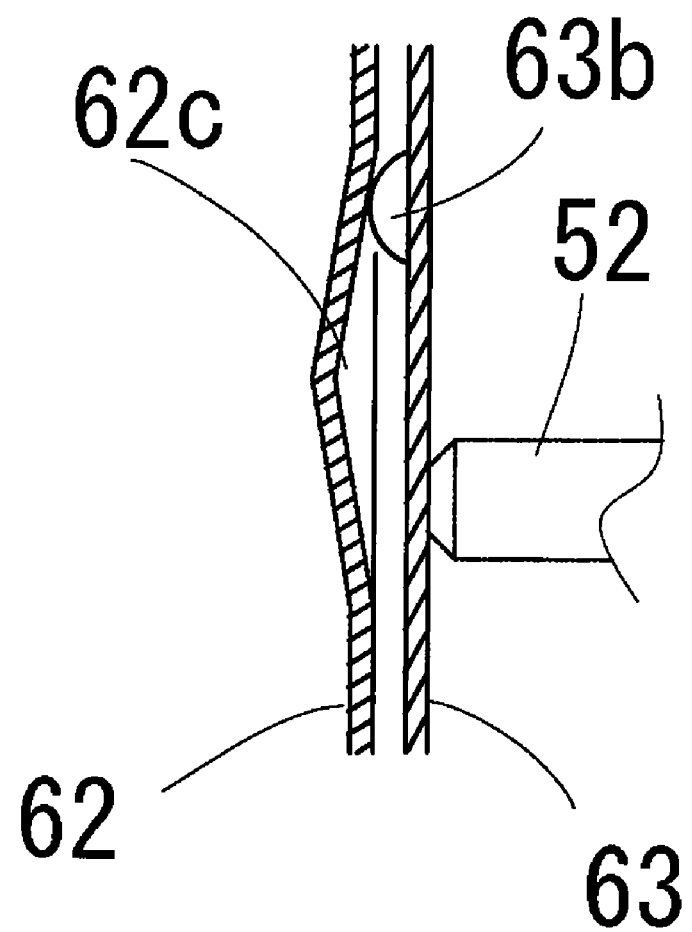
FIG. 16 is a fragmentary sectional plan view of the actuator and the friction mechanism in the state shown in FIG. 15.
Figure 17:
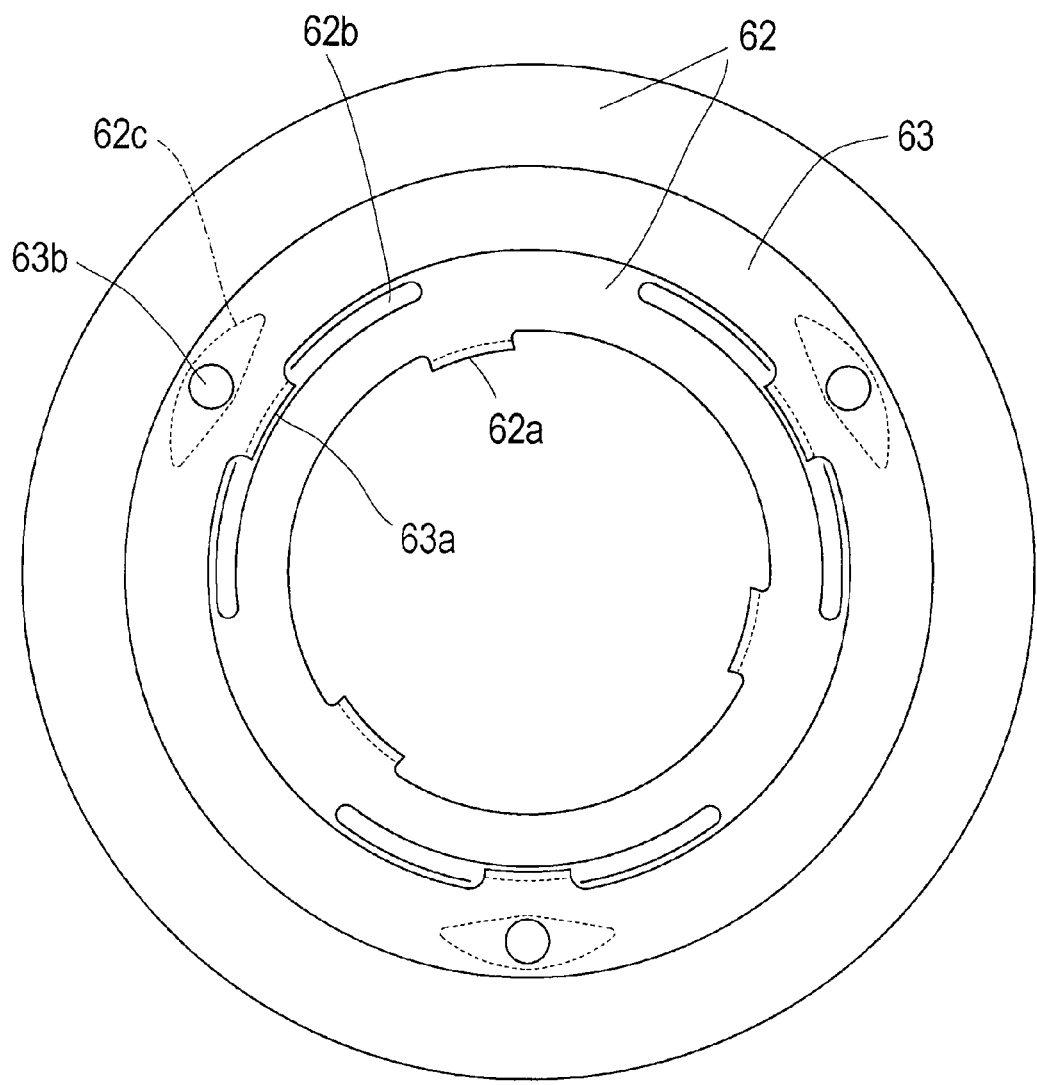
FIG. 17 is a side view of the friction mechanism of the differential unit according to the second embodiment when the actuator is set at the non-on-demand position.
Figure 18:
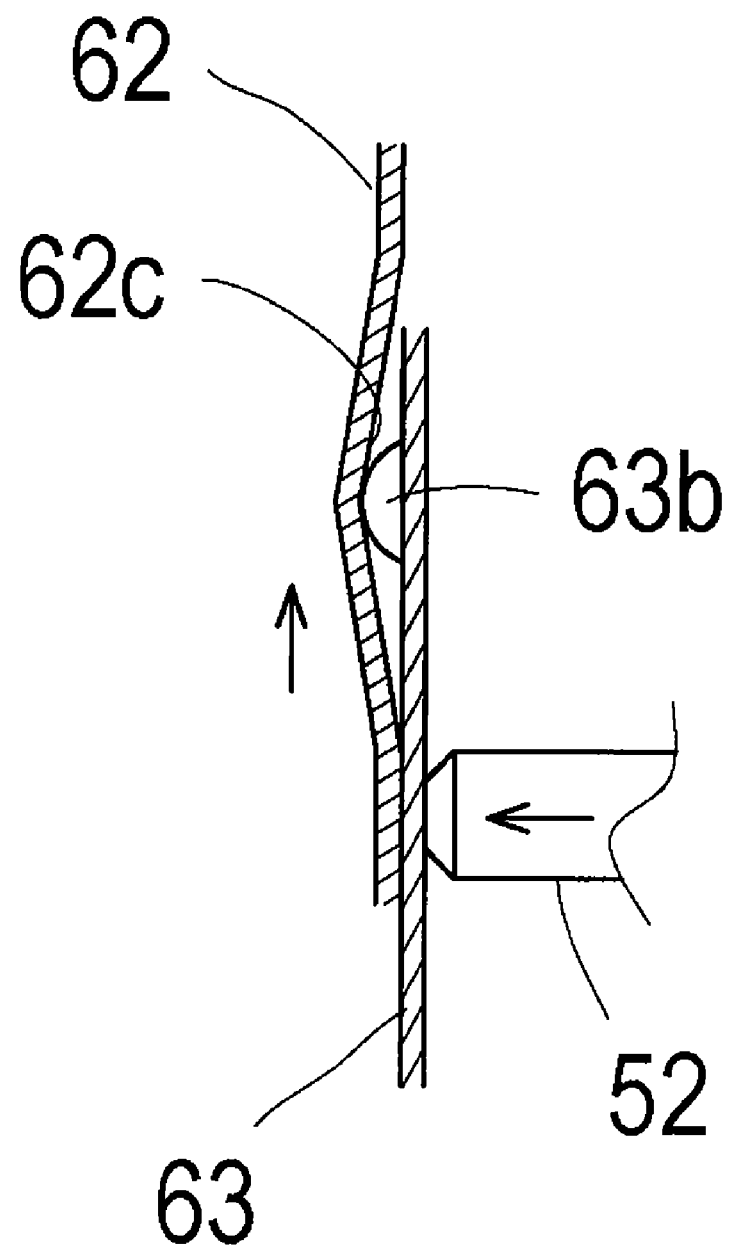
FIG. 18 is a fragmentary sectional plan view of the actuator and the friction mechanism in the state shown in FIG. 17.

Thrusting plate 63 is formed with convexes 63b projecting toward rotary friction plate 62 at regular intervals in the peripheral direction thereof. Rotary friction plate 62 is on an axially distal side surface thereof formed with cam recesses 62c corresponding to respective convexes 63b. Each of cam recesses 62c is peripherally extended and diamond-shaped when axially viewed in a side view, as shown in FIGS. 15 and 17, and has a depth for accommodating each convex 63b, so that the depth is gradually increased from each of the opposite peripheral ends thereof toward the peripheral center, as shown in FIGS. 16 and 18. When each convex 63b is fitted to the center portion of corresponding cam recess 62c, rotary friction plate 62 is located relative to thrusting plate 63 so as to locate rollers 7 relative to clutch housing 4 as shown in FIG. 6.

Figure 14:
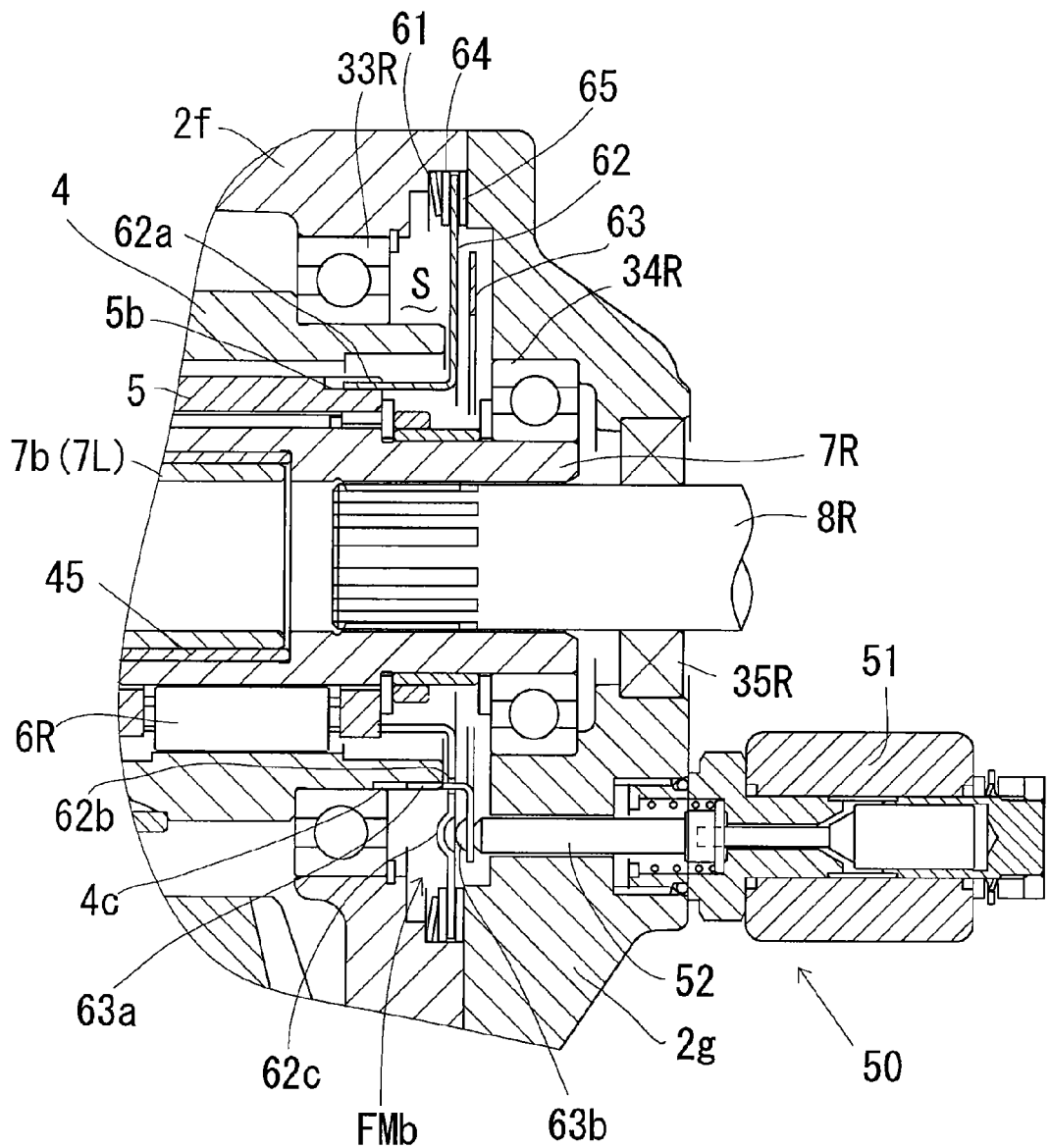
FIG. 14 is a sectional plan view of a principal portion of a bi-directional overrunning clutched differential unit according to a second embodiment according to the present invention, showing an actuator.

The tip of spool 52 of actuator 50 faces an (right) outer side surface of thrusting plate 63 opposite to rotary friction plate 62. The on-demand position of actuator 50 according to the second embodiment is defined as the position where spool 52 is withdrawn by non-excitation of solenoid 51 as shown in FIG. 14. In this regard, when clutch housing 4 rotates, thrusting plate 63 rotates integrally with clutch housing 4, meanwhile, the rotation of rotary friction plate 62 rotatably integral with cage 5 occurs after the rotation of clutch housing 4 as a result of the frictional rotation resistance from disc spring 61. Accordingly, as shown in FIGS. 15 and 16, each convex 63b moves onto one of the shallower opposite peripheral ends of each recess 62c so as to withdraw thrusting plate 63 from rotary friction plate 62 along with the movement of convexes 63b relative to recesses 62c. In this way, the delay of rotation of cage 5 after clutch housing 4 occurs, so as to create the on-demand mode as shown in FIG. 5 where rollers 6 contact respective cams 4a. In this state, as mentioned above, the overrunning clutch is engaged or disengaged according to variation of the relative rotation speed of hubs 7 to clutch housing 4. Therefore, the travel of vehicle 100 can be shifted into the four-wheel drive mode on demand.

Actuator 50 according to the second embodiment is set to the non-on-demand position when spool 52 is thrust with excitation of solenoid 51. As a result of the thrusting of spool 52, thrusting plate 63 is rotated while being pushed axially toward rotary friction plate 62 until each convex 63b contacts the deepest peripheral center portion of recess 62c as shown in FIGS. 17 and 18. Accordingly, rotary friction plate 62 rotatably integral with cage 5 is relatively unrotatably engaged to thrusting plate 63, which is rotatably integral with clutch housing 4. Consequently, when clutch housing 4 rotates while keeping the state as shown in FIG. 6, cage 5 rotates integrally with clutch housing 4 without delay, so as to keep the state as shown in FIG. 6 where rollers 6 are separated from respective cams 4a. Therefore, differential unit 1 is set in the non-on-demand mode, where the overrunning clutch of differential unit 1 is constantly disengaged so that vehicle 100 constantly travels in the two-wheel drive mode.

It is further understood by those skilled in the art that the foregoing description is a preferred embodiment of the disclosed differential unit and that various changes and modifications may be made in the invention without departing from the scope thereof defined by the following claims.

What is claimed is:

1. A bi-directional overrunning clutched differential unit comprising:
    a differential housing;
    a pair of coaxial output shafts relatively rotatably supported by the differential housing;
    a pair of coaxial cylindrical hubs relatively unrotatably fitted on the respective output shafts, wherein an axially proximal end of one of the hubs is relatively rotatably fitted into an axially proximal end of the other of the hubs;
    a pair of first bearings disposed opposite to each other in the axial direction of the output shafts, and supported by the differential housing so as to journal the respective hubs;
    a cylindrical cage coaxially disposed around the hubs between the first bearings;
    a cylindrical clutch housing coaxially disposed around the cage between the first bearings;
    a pair of second bearings disposed opposite to each other in the axial direction of the output shafts, and supported by the differential housing so as to journal the clutch housing, wherein the pair of second bearings are diametrically larger than the first bearings, and are disposed between the first bearings in the axial direction of the output shafts so as to ensure a space between one of the first bearings and one of the second bearings;
    first and second groups of rollers held by the cage, wherein the rollers of the first group are aligned at regular intervals along the periphery of the cage and contact an outer peripheral surface of one of the hubs, and wherein the rollers of the second group are aligned at regular intervals along the periphery of the cage and contact an outer peripheral surface of the other of the hubs;
    cams formed on an inner peripheral surface of the clutch housing so as to be adapted to radially press each of the rollers against the respective hubs; and
    a friction mechanism disposed in the space so as to apply a frictional rotation resistance onto the cage.

2. The bi-directional overrunning clutched differential unit according to claim 1, wherein the friction mechanism disposed in the space comprises:
    a rotary friction member rotatably integrally engaged to a corresponding axial end of the cage;
    a fixture friction member unrotatably engaged to the differential housing; and
    a pressure means frictionally pressing the rotary friction member and the fixture friction member against each other.

3. The bi-directional overrunning clutched differential unit according to claim 2, further comprising:
    an actuator supported by the differential housing, wherein the actuator is adapted to disengage the fixture friction member from the differential housing so as to allow the fixture friction member to rotate together with the rotary friction member.

* * * * *